(12) United States Patent
Tanaka et al.

(10) Patent No.: US 6,233,004 B1
(45) Date of Patent: *May 15, 2001

(54) IMAGE PROCESSING METHOD AND APPARATUS

(75) Inventors: Koichiro Tanaka, Tokyo; Akihiro Katayama, Yokosuka; Takahiro Oshino, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,886

(22) Filed: Oct. 15, 1997

Related U.S. Application Data

(63) Continuation of application No. 08/423,959, filed on Apr. 18, 1995, now abandoned.

(30) Foreign Application Priority Data

Apr. 19, 1994 (JP) .................................................. 6-080072

(51) Int. Cl.$^7$ ..................................................... H04N 7/18
(52) U.S. Cl. .................................. 348/48; 348/42; 348/39; 348/51

(58) Field of Search ................................. 348/36, 38, 39, 348/42, 43, 44, 46, 47, 48, 51; 395/125, 154

(56) References Cited

U.S. PATENT DOCUMENTS

| | | | |
|---|---|---|---|
| 5,101,268 | * 3/1992 | Ohba | 348/39 |
| 5,153,756 | * 10/1992 | Smith | 348/40 |
| 5,200,818 | * 4/1993 | Neta et al. | 348/46 |
| 5,365,370 | * 11/1994 | Hudgins | 359/464 |
| 5,424,773 | * 6/1995 | Saito | 348/39 |
| 5,444,478 | * 8/1995 | Lelong et al. | 348/40 |
| 5,495,576 | * 2/1996 | Ritchey | 385/125 |
| 5,502,481 | * 3/1996 | Dentinger et al. | 348/51 |
| 5,650,814 | * 7/1997 | Florent et al. | 348/39 |
| 5,714,997 | * 2/1998 | Anderson | 348/39 |

FOREIGN PATENT DOCUMENTS 2244621  12/1991 (GB).
8804804  6/1988 (WO).

* cited by examiner

*Primary Examiner*—Andy Rao
(74) *Attorney, Agent, or Firm*—Morgan & Finnegan LLP

(57) ABSTRACT

An image processing apparatus detects corresponding pixels in object images picked up from a plurality of viewpoints and interpolates object images which are supposed to be seen from viewpoints other than the plurality of viewpoints on the basis of the detected corresponding pixels.

48 Claims, 14 Drawing Sheets

FIG. 13 j-TH EPIPOLAR PLANE

|   | 1 | 2 | 3 | 4 | 5 | 6 | 7 | 8 | 9 | 10 | ... | nx |
|---|---|---|---|---|---|---|---|---|---|----|-----|----|
| 1 |   |   |   |   | a2 | b2 |   |   |   |    | ... |    |
| 2 |   |   |   | a2 | b2 | c1 |   |   |   | c1 | ... |    |
| 3 |   |   | a2 | c1 |   |   |   |   |   |    | ... |    |
| 4 |   | a2 | b2 |   |   |   |   |   |   |    | ... |    |

FIG. 14 j-TH EPIPOLAR PLANE

| | 1 | 2 | 3 | 4 | 5 | 6 | 7 | 8 | 9 | 10 | ... | nx |
|---|---|---|---|---|---|---|---|---|---|---|---|---|
| 1 | | | | | | | | | | c1 | ... | |
| 2 | | | | | | | | c | a2 | | ... | |
| 3 | | | | | a | a2 | c | b | b2 | | ... | |
| 4 | | | | a | a2 | a | b | c1 | b | | ... | |
| 5 | a2 | a | b | b2 | b | c | | | | | ... | |
| 6 | b2 | b | | | c | | | | | | ... | |
| 7 | | | | c1 | | | | | | | ... | |
| 8 | | | c | | | | | | | | ... | |
| 9 | | c | | | | | | | | | ... | |
| 10 | c1 | | | | | | | | | | ... | |

↑ INTERPOLATION LINE ; j-2
↑ INTERPOLATION LINE ; j-3
↑ INTERPOLATION LINE ; j-5
↑ INTERPOLATION LINE ; j-6
↑ INTERPOLATION LINE ; j-8
↑ INTERPOLATION LINE ; j-9

IMAGE PROCESSING METHOD AND APPARATUS

This is a continuation of application Ser. No. 08/423,959, filed on Apr. 18, 1995, now abandoned.

BACKGROUND OF THE INVENTION

The present invention relates to an image processing method and apparatus and, more particularly, to an image processing method and apparatus capable of displaying an image seen from an arbitrary photo-taking viewpoint based on an input image from image sensing means, such as cameras.

There are stereoscopic display systems and lenticular display systems, and so on, known as conventional apparatuses for displaying images, seen from a plurality of viewpoints, to be seen stereoscopically. The former displays an image to be seen stereoscopically by alternatively displaying images from two cameras on a screen at high speed. When a viewer sees the images through shutter glasses which operates in synchronization with the alternating speed, or polarizing glasses, the images are observed as stereoscopic image.

The latter rearranges images from four cameras, for example, by pixel unit. Then, by placing a lenticular sheet in front of a display, the images seen from four viewpoints can be displayed so as to be seen stereoscopically.

However, the conventional stereoscopic display system has a problem in that a viewer can see a stereoscopic image only from fixed viewpoints where cameras are set. More specifically, when two cameras are set at fixed positions and pick up object images for stereoscopic display, even after the viewer moved his/her viewpoint, the viewer sees the same stereoscopic image.

In contrast, by using the lenticular display system, the viewer can observe different images after changing his/her viewpoint to the right and left direction. However, in this case, the viewer can see images from each camera discontinuously, and can not see continuous images corresponding to changing of the viewpoints. In addition, it is not possible for the viewer to see continuous images when his/her viewpoints are changed in the back and forth direction.

It is possible to display continuous images corresponding to changing of the viewpoints in the vertical direction when an image produced by computer graphics is displayed stereoscopically, however, not possible when an image, such as an object image, picked up by a plurality of cameras at fixed positions is displayed stereoscopically.

SUMMARY OF THE INVENTION

The present invention has been made in consideration of the above situation, and has as its object to obtain a continuous image corresponding to the movement of the viewer's viewpoints by using images picked up by a plurality of cameras at fixed positions.

According to the present invention, the foregoing object is attained by providing an image processing method comprising: a corresponding pixel detecting step of detecting corresponding pixels among object images picked up from a plurality of viewpoints; and a generation step of presuming object images seen from viewpoints other than the plurality of viewpoints on the basis of the detected corresponding pixels.

Further, the foregoing object is also attained by providing a three dimensional viewpoint movement corresponding image processing method comprising: a viewpoint detecting step of detecting positions of viewer's eyes; and an image generating step of generating images seen from the positions of viewer's eyes detected at the viewpoint detecting step by using at least a part of the images, corresponding to each viewpoint, which are generated by the image processing method according to the claim 1.

Further, the foregoing object is also attained by providing a three dimensional viewpoint movement corresponding image processing method comprising: a viewpoint detecting step of detecting positions of viewer's eyes; an image generating step of generating images seen from the positions of the viewer's eyes on the basis of the positions of viewer's eyes detected at the viewpoint detecting step and generated images seen at the plurality of different distances from the object to the plurality of viewpoints, where the picked-up images are generated by the three dimensional viewpoint movement corresponding image processing method according to claim 9; and a displaying step of displaying images generated at the image generating step.

Further, the foregoing object is also attained by providing an image processing apparatus comprising: corresponding pixel detecting means for detecting corresponding pixels among object images picked up from a plurality of viewpoints; and generation means for presuming object images seen from viewpoints other than the plurality of viewpoints on the basis of the detected corresponding pixels.

Further, the foregoing object is also attained by providing a three dimensional viewpoint movement corresponding image processing apparatus comprising: viewpoint detecting means for detecting positions of viewer's eyes; and image generating means for generating images seen from the positions of viewer's eyes detected by the viewpoint detecting means by using at least a part of the images, corresponding to each viewpoint, which are generated by the image processing apparatus according to the claim 14.

Further, the foregoing object is also attained by providing a three dimensional viewpoint movement corresponding image processing apparatus comprising: viewpoint detecting means for detecting positions of viewer's eyes; image generating means for generating images seen from the positions of the viewer's eyes on the basis of the positions of viewer's eyes detected by the viewpoint detecting means and generated images seen at the plurality of different distances from the object to the plurality of viewpoints, where the picked-up images are generated by the three dimensional viewpoint movement corresponding image processing apparatus according to claim 22; and a displaying means for displaying images generated by the image generating means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a drawing illustrating an interpolation algorithm;

FIG. 14 is a drawing illustrating an interpolation algorithm;

DETAILED DESCRIPTION OF THE PREFERRED EMBODIMENTS

Preferred embodiment of the present invention will be described in detail in accordance with the accompanying drawings.

First Embodiment

Figure 1:
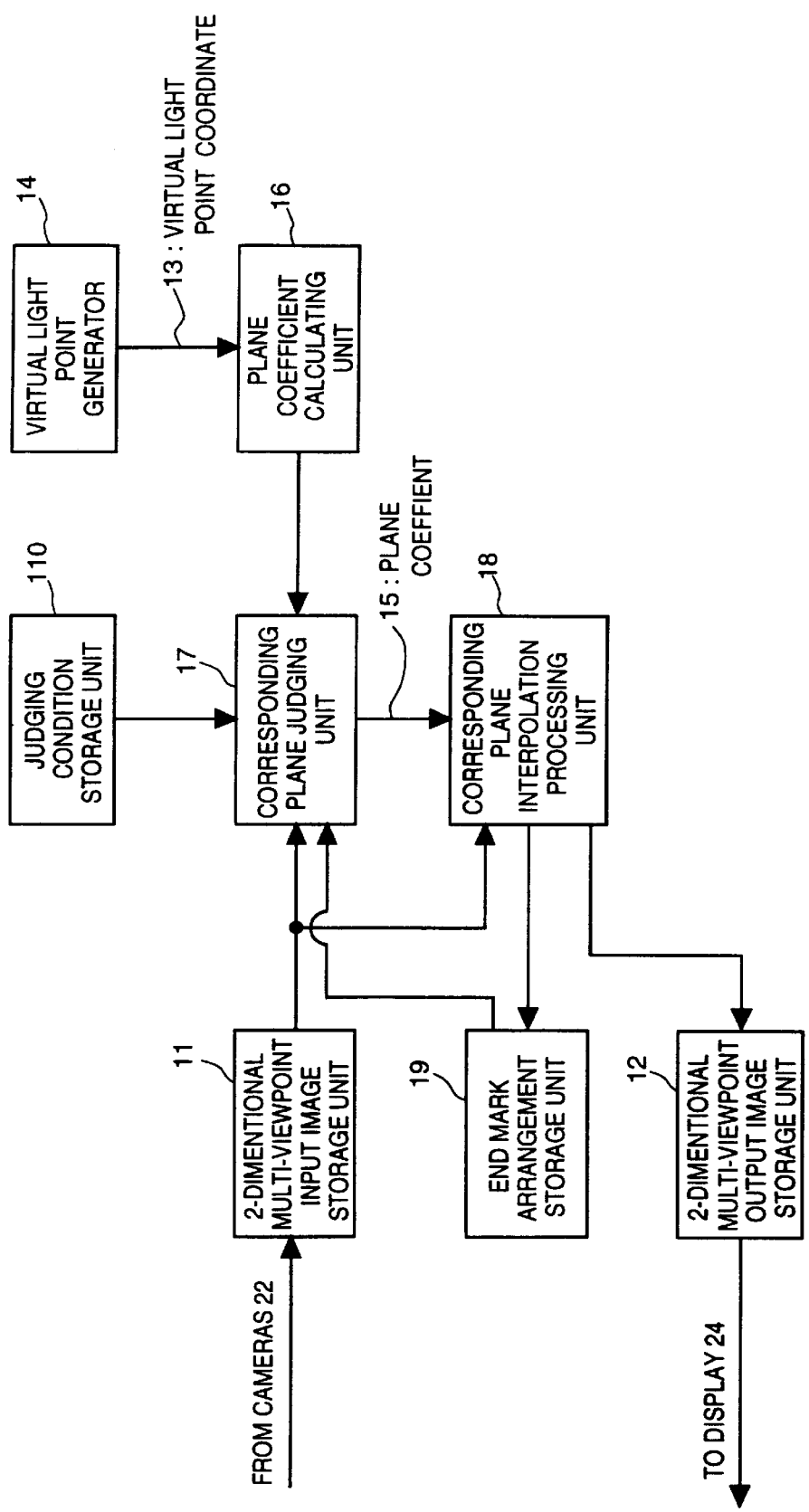
FIG. 1 is a block diagram showing a constitution of an image processing apparatus according to a first embodiment.

FIG. 1 is a block diagram illustrating configuration of an image interpolation processing unit of an image processing apparatus according to a first embodiment.

In FIG. 1, reference numeral 11 denotes a two dimensional multi-viewpoint input image storage unit (referred as "input image storage unit 11", hereinafter) for storing images inputted from a plurality of cameras 22 which are described later. Further, reference numeral 12 denotes a two dimensional multi-viewpoint output image storage unit (referred as "output image storage unit 12", hereinafter) for storing an image to be outputted to a display 24 with viewpoint detector which will be described later.

Reference numeral 13 denotes virtual light point coordinate values representing virtual light point in a photo-taking space; 14, a virtual light point generator for generating the virtual light point coordinate 13; 15, plane coefficients representing a pixel plane in a two dimensional multi-viewpoint image and corresponding to the virtual light point coordinate 13; and 16, a plane coefficient calculating unit for calculating the plane coefficients 15 on the basis of the virtual light point coordinate 13.

Further, a corresponding plane judging unit 17 judges whether or not the pixel plane represented by the plane coefficients 15 exists in an image stored in the input image storage unit 11. More specifically, a matching process for finding corresponding pixels in images picked up by the cameras 22 is performed. A corresponding plane interpolation processing unit 18 performs interpolation on the two dimensional multi-viewpoint input image in accordance with the plane coefficients 15 of a plane ensured of its existence by the corresponding plane judging unit 17, and generates a two dimensional multi-viewpoint output image.

Furthermore, reference numeral 19 denotes an end mark arrangement storage unit for storing an input image's pixel positions which are applied with pixel matching process by the corresponding plane judging unit 17, and reference numeral 110 denotes a judging condition storage unit for storing predetermined judging conditions used by the corresponding plane judging unit 17.

Note, each component of the image interpolation processing unit is a micro computer composed of CPU, ROM, RAM, and the like.

Figure 2:
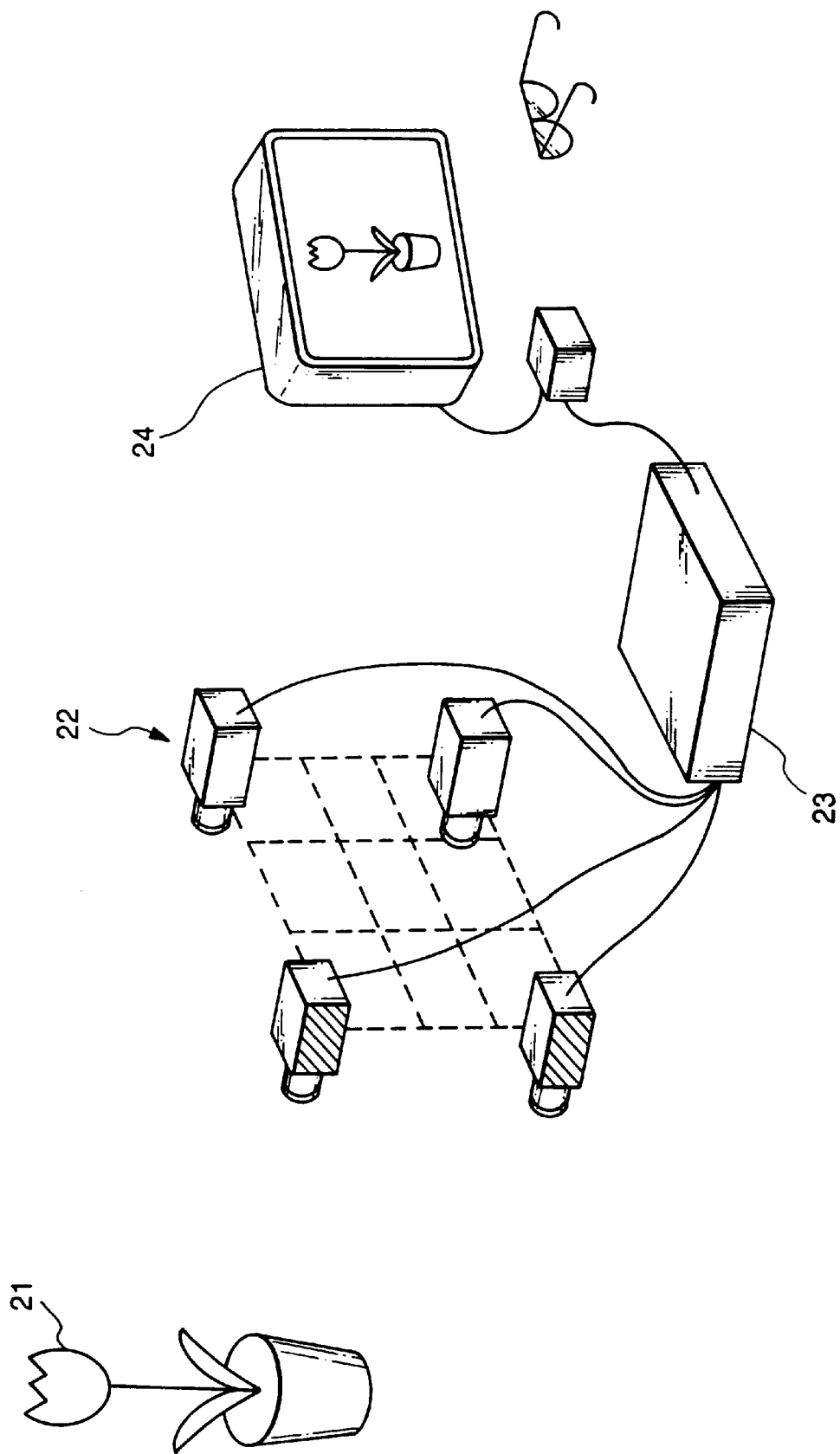
FIG. 2 illustrates a brief system configuration of the image processing apparatus according to the first embodiment.

FIG. 2 illustrates a system configuration of the image processing apparatus according to the first embodiment.

In FIG. 2, reference numeral 21 denote an object whose image is to be picked up. Further, the aforesaid plurality of cameras 22 pick up images of the object 21, and the plurality of cameras (four cameras in this embodiment) are arranged in both the vertical and horizontal directions on a plane apart from the object 21 at a predetermined distance, and have respectively parallel image pickup optical axes.

In the present embodiment, by arranging the four cameras as described above, it is possible to virtually move a viewpoint both in the vertical and horizontal directions smoothly, as will be described below.

Reference numeral 23 denotes the image interpolation processing unit whose configuration is as shown in FIG. 1. Further, the display 24 is for displaying the two dimensional multi-viewpoint output image outputted from the image interpolation processing unit 23.

Next, referring to FIGS. 1 and 2, an operation of the image processing apparatus of the first embodiment will be described.

First, an image of the object 21 is picked up by the cameras 22 from different photo-taking viewpoints separated in the vertical and horizontal directions. The obtained plurality of images are inputted and stored in the input image storage unit 11 in the image interpolation processing unit 23.

Each position of the four cameras when they pick up an image to be stored in the input image storage unit 11 is denoted by C (vector), and defined by a following equation (1).

$$C=(C_x, C_y) \quad (1)$$

It should be noted that each vector component which satisfies equation 1 is represented by a coordinate value in a two dimensional coordinate system representing a plane whose origin is defined by the center of viewpoints of each camera 22.

Further, a position of each pixel of the image picked up by each camera is denoted by P (vector), and defined by a following equation (2).

$$P=(P_x, P_y) \quad (2)$$

Note, each vector component which satisfies equation (2) is a coordinate point in a coordinate system, expressed in the same unit as that of the above coordinate system for expressing the vector C of each camera, whose origin is the center of the image surface picked-up by each camera.

In this case, a multi-viewpoint image of the object 21 picked-up from different viewpoints to be stored in the input image storage unit 11 can be expressed with a four dimensional array of pixel values represented by the coordinate points of the camera positions C and the pixel positions P.

In the image interpolation processing unit 23 shown in FIG. 1, first the virtual light point generator 14 decides a single virtual light point in the photo-taking space where the object 21 is placed, then the virtual light point coordinate 13 representing the decided virtual light point is generated. The virtual light point coordinate 13 is denoted by X (vector) for convenience, and defined by a following equation (3).

$$X=(X_x, X_y, X_z) \qquad (3)$$

It should be noted that each vector component which satisfies the equation (3) is a coordinate value on a three dimensional coordinate system whose origin is the center of viewpoints of each camera 22 and whose z-axis in the positive direction is in the photo-taking direction. In order to deal with an "occlusion" effect, that is, a situation in which a front light point (or object) hides a light point (or object) behind, a virtual light point is sequentially generated from front with respect to the cameras, in other words, from the virtual light point nearer to the cameras. More specifically, in order to avoid a problem caused by the occlusion, the order of the plane coefficients to be sent to the corresponding plane judging unit 17 corresponding to each virtual light point is the same as that of light points arranged from light point nearer to the cameras. The detail will be explained later.

Figure 16:
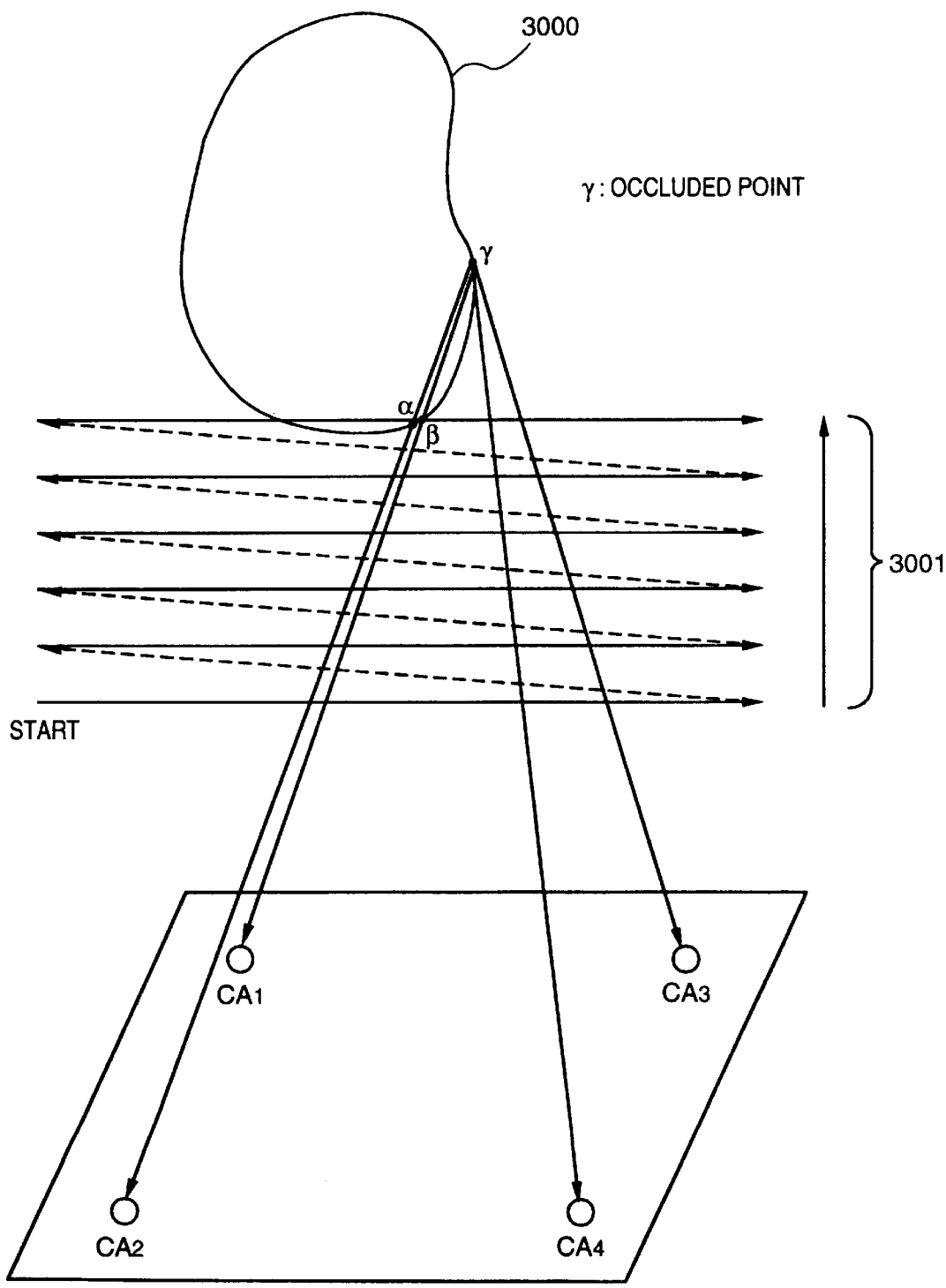
FIG. 16 is a drawing explaining a method of avoiding occlusion problem by using an end mark.

FIG. 16 is a diagram explaining a way to avoid the occlusion problem.

In FIG. 16, reference numeral 3000 denotes an object, and four cameras CA1, CA2, CA3 and CA4 pick up images of the object 3000. In this situation, a virtual light point is sequentially generated from the front toward the object with respect to the cameras as an arrow 3001 shows. For example, the virtual point α is on the object and can be seen from all the cameras, and after a matching process (will be described later in detail) is applied to pixels corresponding to the point α in each image, "end marks" indicating that the matching process has applied to the pixels are stored at the pixel positions for each camera corresponding to the point α in the end mark arrangement storage unit 19. Similarly, regarding a virtual light point β, corresponding pixels in the images picked up by all the cameras are matched, and the end marks are set and stored. As for a virtual point γ, it is not seen from the cameras CA1 and CA2 because the points α and β exist (occlusion occurred), however, it is seen from the cameras CA3 and CA4. Under this circumstance, it is confirmed that there is the "end mark" at the pixel position corresponding to the position β on a line connecting the position of the camera CA1 and the virtual point γ, and another "end mark" at the pixel position corresponding to the position α on a line connecting the position of the camera CA2 and the virtual point γ. Accordingly, image data from the cameras CA3 and CA4 is used for the interpolation processing for the virtual point γ.

As described above, it is possible to avoid the occlusion problem in the interpolation processing by sequentially generating virtual light points from the front with respect to the cameras toward the object 3000 (in the direction of arrow 3001).

If it is assumed that a light point represented by the virtual light point coordinate 13 actually exists on the object 21, a pixel image at the virtual light point is projected at slightly different pixel points P's in each image of the multi-viewpoint image, stored in the input image storage unit 11. Further, as described above, assuming that the multi-viewpoint image can be expressed by a four dimensional pixel array, the pixels in the images corresponding to the virtual light point define a plane in a four dimensional space (a partial space in a four dimensional space with two degrees of freedom).

After aforesaid process, the plane coefficient calculating unit 16 calculates the plane coefficients 15 in accordance with the virtual light point coordinate 13. The plane coefficients 15 uniquely defines a plane where a pixel of an image at the virtual light point represented by the virtual light point coordinate 13 exists. If the plane coefficients 15 is denoted by K, it can be calculated from a following equation (4) by using the virtual light point coordinate 13.

$$K=(K_a, K_x, K_y)=(-1/X_z, X_x/X_z, X_y/X_z) \qquad (4)$$

Then, a plane function of the equation (4) is described by following functions.

$$P_x=K_a \cdot C_x + K_x$$
$$P_y=K_a \cdot C_y + K_y \qquad (4')$$

The plane coefficients 15 calculated by the plane coefficient calculating unit 16 is input to the corresponding plane judging unit 17. Then, the corresponding plane judging unit 17 judges on the basis of the plane coefficients 15, whether or not pixels corresponding to the identical virtual light point exist in the images on the plane. In other words, whether or not the virtual light point represented by the virtual light point coordinate 13 exists on the object 21.

Upon judging by the corresponding plane judging unit 17, an end mark (will be described later) stored in the end mark arrangement storage unit 19 is used to deal with the aforesaid occlusion problem. The end mark, as will be described later, is set to a pixel on which interpolation is completed by the corresponding plane interpolation processing unit 18. Then, on the basis of the end mark and judgment performed by the corresponding plane judging unit 17 (refer to flow-chart in FIG. 3) in accordance with a variance of corresponding pixels in the images picked up by the cameras 22 (the judgment will be described later), whether or not images including the pixels corresponding to the identical virtual light point exist on a plane is determined.

When it is ensured that the images including the pixels corresponding to the identical virtual light point exist on the plane, the corresponding plane judging unit 17 inputs the plane coefficients 15 to the corresponding plane interpolation unit 18. The corresponding plane interpolation unit 18 applies interpolation to the multi-viewpoint image stored in the input image storage unit 11 on the basis of the plane coefficients 15 inputted by the corresponding plane judging unit 17.

As described above, the corresponding plane interpolation unit 18 generates data of images seen at very small viewpoint intervals, and provides the data to the output image storage unit 12. At this time, the end marks are set to the pixels to which the interpolation is applied, and stored in the end mark arrangement storage unit 19.

The virtual light point generator 14 assumes existence of all the virtual light points which can be included in the photo-taking space of the object 21, and sequentially generates the virtual light point coordinate 13 uniquely representing each virtual light point. Likewise, all the pixels in the images corresponding to the light points on the object 21 are applied with the aforesaid interpolation process, and images obtained after the interpolation are stored in the output image storage unit 12.

Accordingly, in the output image storage unit 12, there is stored a multi-viewpoint image seen at a smaller viewpoint intervals than those of the multi-viewpoint image stored in the input image storage unit 11. More specifically, four images, which are seen at viewpoints whose distances between the each other corresponds to the distances between respective cameras picking up the image, are stored in the input image storage unit 11. On the contrary, a great number of interpolation images, virtually seen at viewpoint intervals much smaller than those between the cameras, are stored in the output image storage unit 12.

These great number of interpolation images corresponds to images of the object 21 seen from a great number of viewpoints (from virtual cameras) between cameras arranged in the vertical and horizontal directions. Thus, by displaying the great number of interpolation images on the display 24 sequentially, it is possible to display an image smoothly changing in accordance with the movement of the viewpoint in the vertical or horizontal directions.

Figure 3:
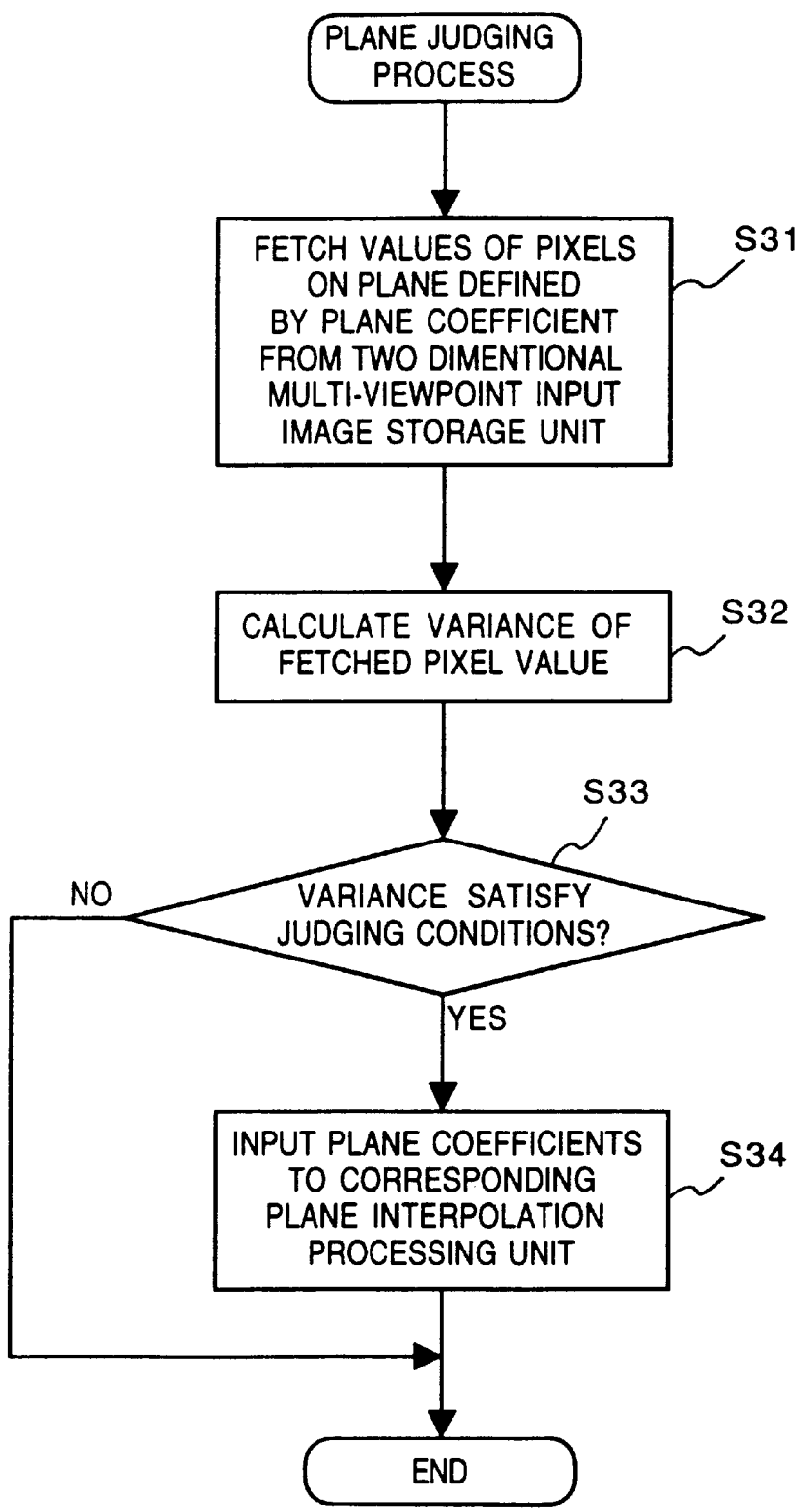
FIG. 3 is a flowchart showing a judging process by a corresponding plane judging unit according to the first embodiment.

FIG. 3 is a flowchart showing a judging process by a corresponding plane judging unit 17. The corresponding plane judging unit 17 is fed with plane coefficients defining a plane corresponding to each virtual light point one set at a time, and performs matching judgment of matching pixels, corresponding to the virtual light points, in the input images picked up by each camera.

First, at step S31 in FIG. 3, pixels on a plane which is defined by the plane coefficients 15 given by the plane coefficient calculating unit 16 are fetched from the input image storage unit 11. The positions P of pixels of an image on the plane defined by the plane coefficients 15 are calculated by using the following equation (5). The equation (5) is equation 4' in a vector notation.

$$P=(K_a \cdot C_x + K_x, K_a \cdot C_y + K_y) \quad (5)$$

Next at step S32, in accordance with the end marks stored in the end mark arrangement storage unit 19, the pixel values fetched at step S31 are selected by checking the variance (variance of density of pixels in images picked up by each camera) in order to avoid the occlusion problem caused. For example, pixels which are not set with end marks are considered to be subjects for variance. Thus, by excluding pixels which have already been processed with interpolation in the subsequent interpolation, deterioration of the interpolation images caused by occlusion can be prevented.

At step S33, whether or not the variance calculated at step S32 satisfies the judging conditions stored in the judging condition storage unit 110 is checked. For instance, whether or not the calculated variance is less than a predetermined threshold is checked. If the calculated variance is less than the threshold, it means that corresponding pixels of images taken by different cameras match each other. When the judging conditions are satisfied, the process proceeds to step S34, and the plane coefficients 15 is inputted to the corresponding plane interpolation unit 18.

Note, in the plane judging process shown in FIG. 3, the matching process in which pixels, corresponding to the virtual light point, of images taken by different cameras are matched against each other. The same process is repeated until all the possible virtual light points in the predetermined space are swept.

Figure 4:
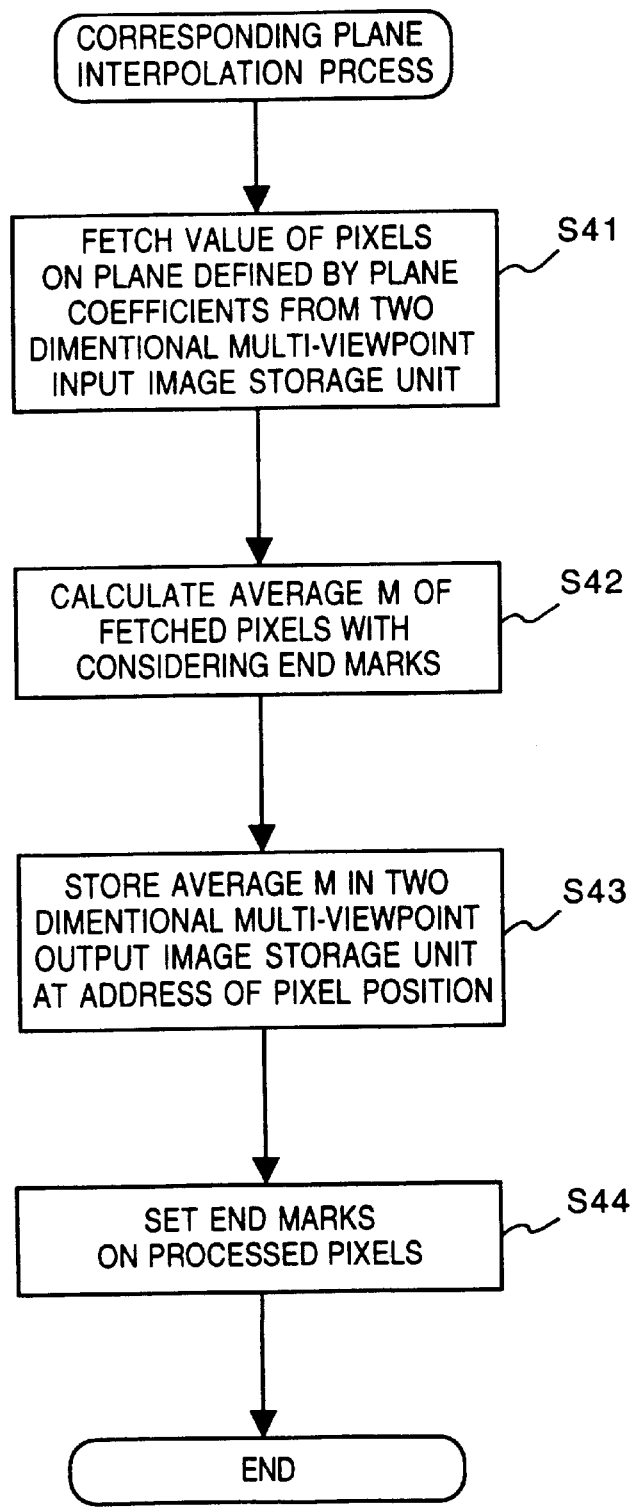
FIG. 4 is a flowchart showing an interpolation process by a corresponding plane interpolation unit according to the first embodiment.
Figure 5:
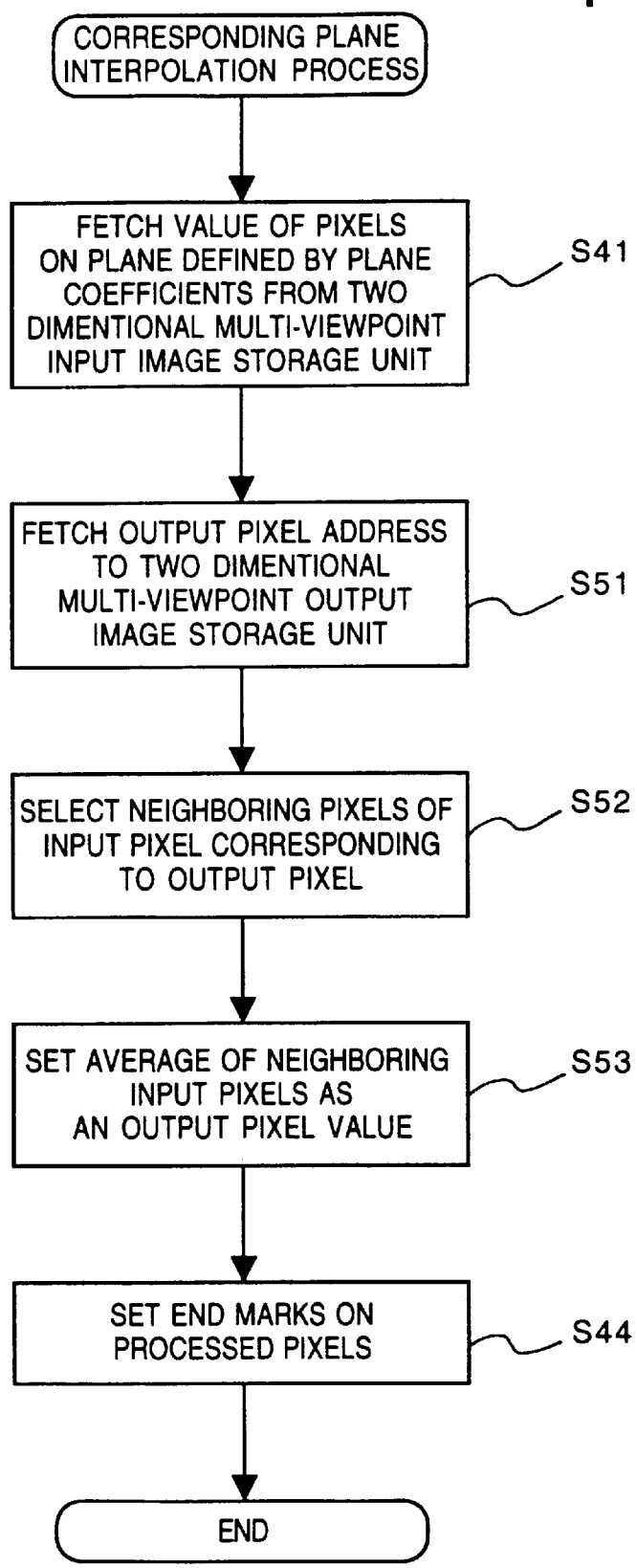
FIG. 5 is a flowchart showing an interpolation process by the corresponding plane interpolation unit according to a second embodiment.

Next, FIG. 4 is a flowchart showing the process of interpolation by the corresponding plane interpolation unit 18. The corresponding plane interpolation unit 18 repeatedly performs interpolation process in accordance with the plane coefficients 15 matched by the corresponding plane judging unit 17. The corresponding plane interpolation unit 18 generates a virtual image taken by virtual cameras assumed to exist inside of a plane limited by the four cameras in FIG. 2, for example.

In FIG. 4, at step S41, values of pixels of images, taken by different cameras, on a plane defined by the plane coefficients 15 calculated at the plane coefficient calculating unit 16 are fetched from the input image storage unit 11. The pixel position P in a local image space, taken by a virtual camera, on a plane defined by the plane coefficients 15 is calculated in accordance with the equation (5), similarly to the process performed by the corresponding plane judging unit 17.

Next, at step S42, by taking the end mark stored in the end mark arrangement storage unit 19 into the consideration, an average M of corresponding pixel values of images, taken by different cameras, fetched at step S41 is calculated. More specifically, in the calculation of the average M, for example, similarly to the process performed by the corresponding plane judging unit 17, only pixels which do not have end marks are used in order to avoid the occlusion problems.

At step S43, the average M calculated at step S42 is stored in the output image storage unit 12 at an address of the pixel position, obtained at step S41, of the presumed image taken by the virtual camera. Then, at step S44, end marks for the pixels interpolated are set and stored in the end mark arrangement storage unit 19.

Second Embodiment

An image processing apparatus according to a second embodiment will be described below.

In the second embodiment, the process performed by the corresponding plane interpolation unit 18 differs from that of the first embodiment. The other processes are similar to that in the first embodiment.

First at step S41, values of pixels of images, taken by different cameras, in a plane defined by the plane coefficients 15 calculated by the plane coefficient calculating unit 16 are fetched from the input image storage unit 11. Then, at step S51, addresses at which interpolation pixels are to be stored in the plane defined by the plane coefficients 15, calculated in a successive process, are fetched from the output image storage unit 12.

Next at step S52, neighboring pixels stored in the input image storage unit 11 and fetched at step S41 (called as "input pixel", hereinafter) corresponding to each pixel address stored in the output image storage unit 12 fetched at step S51 (called as "output pixel address, hereinafter") are selected by using each input pixel and each output pixel address.

At step S53, an average of pixel values of the neighboring input pixels selected at step S52 is calculated, and the obtained pixel average value is stored at the address of the output pixel position. Thereby, pixel values to be outputted to the display are determined. Then, at step S44, an end mark for the pixel which has been applied with aforesaid process is set and stored in the end mark arrangement storage unit 19.

According to the second embodiment as described above, different from the first embodiment, not the average value of input pixels selected in a simple manner but the average of the neighboring input pixel values corresponding to the positions of each output pixel position is used as a pixel value of an interpolation image. Thereby improving quality of the reproduced interpolation image.

Note, in the aforesaid first and second embodiments, the corresponding plane interpolation unit 18 sets end marks in the end mark arrangement storage unit 19 and the corresponding plane judging unit 17 judges by using these end marks, however, the present invention is not limited to this.

For example, the end mark arrangement storage unit 19 can be omitted so as to process without the end mark. By doing so, a generated interpolation image may deteriorate a little, however, the construction of the apparatus is simplified.

By performing the aforesaid generation process of interpolation images seen from moving viewpoints by changing the distance between the object and a plane where cameras are arranged, image data of the object seen from moving viewpoints in the back-and-forth direction can be generated. The generated image data is stored in the output image storage unit 12. Note, the output image storage unit 12 is called "multi-viewpoint data base storage unit 63" in FIG. 6 which will be explained later.

In the above-described interpolation unit, generation of an image corresponding to the movement of viewpoint in the up-and-down and right-to-left directions is described. In the next embodiment, a process for generating and displaying an image corresponding to movement of viewpoint in the back-and-forth direction will be explained. Accordingly, it becomes possible to generate image corresponding to the movement of viewpoint in a three dimensional space.

Third Embodiment

Next, an image processing apparatus according to a third embodiment of the present invention will be described.

In the third embodiment, instead of using the display 24 as shown in FIG. 2, a back-and-forth moving viewpoint corresponding display is used. The embodiment shows an example of an image processing apparatus capable of moving viewpoints smoothly not only in the right-and-left direction and/or up-and-down direction, but also in the back-and-forth direction.

Figure 6:
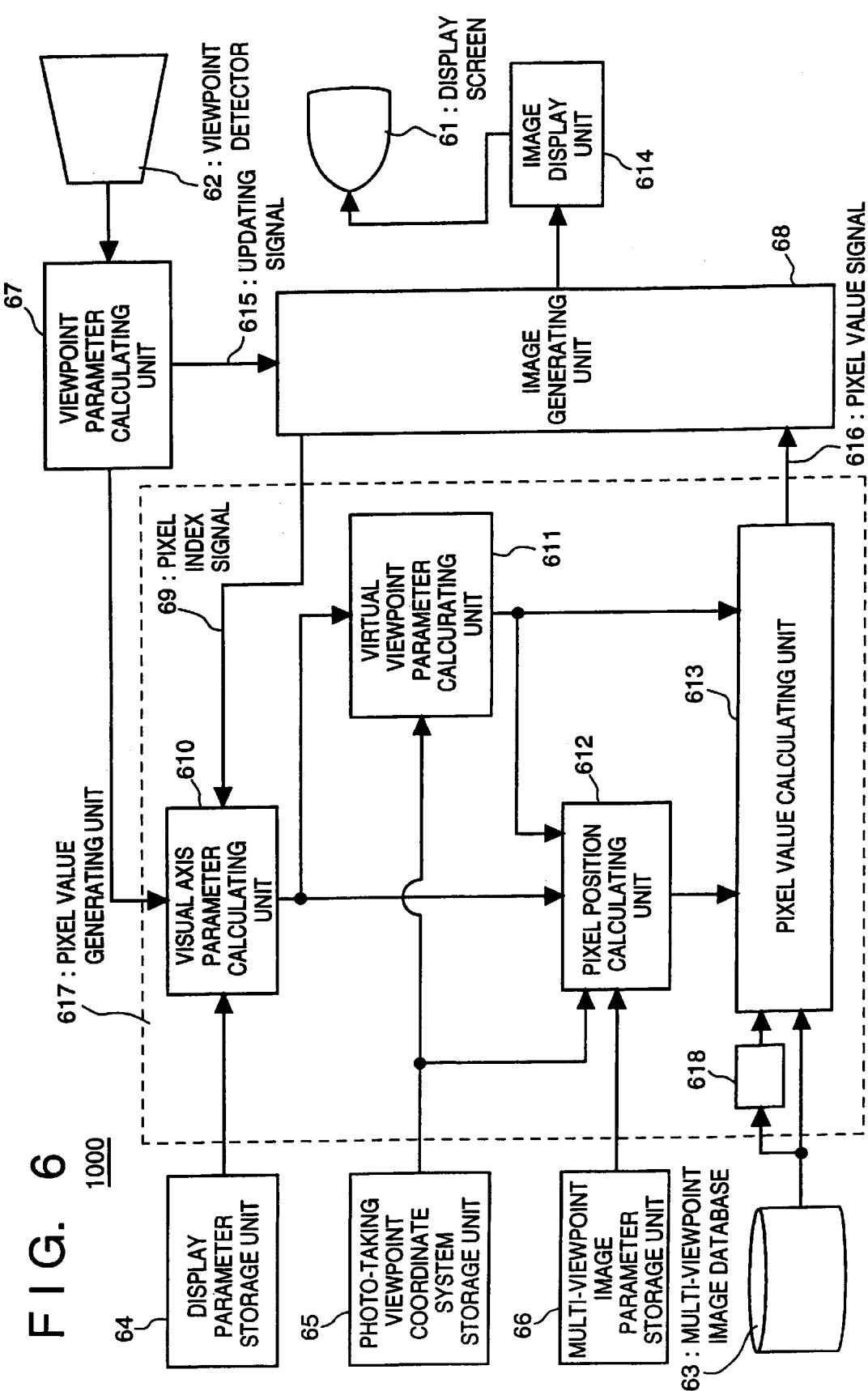
FIG. 6 is a block diagram showing an embodiment of a back-and-forth moving viewpoint corresponding display unit according to a third embodiment.

FIG. 6 is a block diagram illustrating a configuration of the back-and-forth moving viewpoint corresponding apparatus 1000 of the third embodiment.

The apparatus 1000 is for displaying an image reconstructed in a below-described manner for a user (observer) through a display screen 61 set in a stationary state. In detail, the image processing apparatus comprises a viewpoint detector 62 for detecting the position of the user's eyes watching the display screen 61, a multi-viewpoint image database 63 which is a database storing multi-viewpoint image data, a display parameter storage unit 64 for storing display parameters concerning the display screen 61, a photo-taking viewpoint coordinate system storage unit 65 for storing data of a coordinate system of a photo-taking position for each image in the multi-viewpoint image database 63, a multi-viewpoint image parameter storing unit 66 for storing image parameters of images in the multi-viewpoint image database 63, a viewpoint parameter calculating unit 67 for calculating a viewpoint parameter based on a signal from the viewpoint detector 62 and outputting an updating signal 615 when the user changes the position of the viewpoint, an image generating unit 68 for generating an image according to the viewpoint of the user, an image display unit 614 for displaying the image generated by the image generating portion 68 on the display screen, and a pixel value generating unit 617 for calculating pixel values for reconstructing an image to output them as a pixel value signal 616 to the image generating unit 68.

The images in the multi-viewpoint image database 63 are images of an object to be displayed, obtained in the aforesaid interpolation process, and taken from a multitude of viewpoints aligned at sufficiently fine intervals on a plane. Corresponding to it, the data stored in the photo-taking viewpoint coordinate system storage unit 65 is data in the coordinate system indicating the plane of the alignment of the viewpoints at photo-taking the images. Further, the image generating portion 68 is arranged to generate an image when it receives an updating signal 615. The image generating portion 68 outputs a pixel index signal 69 indicating coordinates of a pixel of interest in the image as reconstructed, i.e., in the image on the display screen 61. In reconstructing an image, pixel index signals 69 are output in sequence throughout all pixels in the image to be reconstructed.

The structure of the pixel value generating unit 617 is next described. The pixel value generating unit 617 comprises a visual-axis parameter calculating unit 610 for calculating the direction of the line of sight to a pixel indicated by the pixel index signal 69, from the viewpoint parameter and display parameter, a virtual viewpoint parameter calculating unit 611 for calculating a virtual viewpoint, a pixel position calculating unit 612 for calculating a pixel position to meet the direction of the line of sight in the image seen at the virtual viewpoint, and a pixel value calculating portion 613 for calculating a pixel value of a pixel for the corresponding images in the multi-viewpoint image database 63, based on the pixel position and virtual viewpoint parameter. Here, the virtual viewpoint is an intersection between the line of sight indicated by the visual-axis parameter and the plane of the alignment of the photo-taking viewpoint as dictated by the photo-taking viewpoint coordinate system. The visual-axis parameter, photo-taking viewpoint coordinate system, virtual viewpoint parameter, and multi-viewpoint image parameter are used to calculated the pixel position by the pixel position calculating unit 612. A pixel value calculated in the pixel value calculating portion 613 becomes a pixel value signal 616.

The operation of the present embodiment is next described. Outline of the operation is first explained.

When the user watching the display screen 61 changes the head position so as to move the viewpoint, the signal output from the viewpoint detector 62 changes and then the viewpoint parameter calculating unit 67 receives the change to supply an updating signal 615 to the image generating unit 68. When the image generating unit 68 receives the updating signal 615, it starts generating a new image reflecting the movement of the viewpoint. The generation of new image is performed in such a manner that the image generating unit 68 outputs pixel index signals 69 in sequence for all pixels and obtains pixel value signals 616 for the pixels from the pixel value generating unit 617. Below, the operation of the pixel value generating unit 617 is described.

In the pixel value generating unit 617, the visual-axis parameter calculating portion 610 captures the viewpoint parameter from the viewpoint parameter calculating unit 67 and the display parameter from the display parameter storage unit 64 to calculate a visual-axis parameter corresponding to an inputted pixel index signal 69. Then the virtual viewpoint parameter calculating unit 611 captures the photo-taking viewpoint coordinate from the photo-taking viewpoint coordinate system storage unit 65 to calculate a virtual viewpoint parameter indicating an intersection (virtual viewpoint) between the line of sight indicated by the visual-axis parameter and the plane of the alignment of the photo-taking viewpoints indicated by the photo-taking viewpoint coordinate system. The pixel position calculating unit 612 captures the multi-viewpoint image parameter from the multi-viewpoint image parameter storage unit 66 and calculates a pixel position meeting the direction of the line of sight in the image at the virtual viewpoint from the visual-axis parameter, the photo-taking viewpoint coordinate system, and the virtual viewpoint parameter in addition to the multi-viewpoint image parameter. Then the pixel value calculating unit 613 calculates a corresponding pixel value signal 616 from the images in the multi-viewpoint image database 63, based on the pixel position and the virtual viewpoint parameter. As described, the pixel value generating unit 617 calculates a pixel value signal 616 for each input pixel index signal 69 and outputs it to the image generating unit 68.

After the image generating unit 68 obtains pixel value signals 616 for all pixels from the pixel value calculating unit 613, it supplies the signals to the image display unit 614. The image display unit 614 displays the thus produced image reflecting the new viewpoint on the display screen 61. This concludes the serial image generating operation executed with movement of the user's viewpoint. As will be apparent from the below description, when the user moves the viewpoint back and forth, up and down, or left and right, and, as a result, even if the viewpoint is located at a place other than the viewpoints where the images stored in the multi-viewpoint image database 63 were taken, the user can observe an image of the object reflecting the movement of the viewpoint through the display screen 61.

The processes will be described in detail. For simplicity of description, there is no vertical parallax but only a horizontal parallax considered in the following description.

Figure 7:
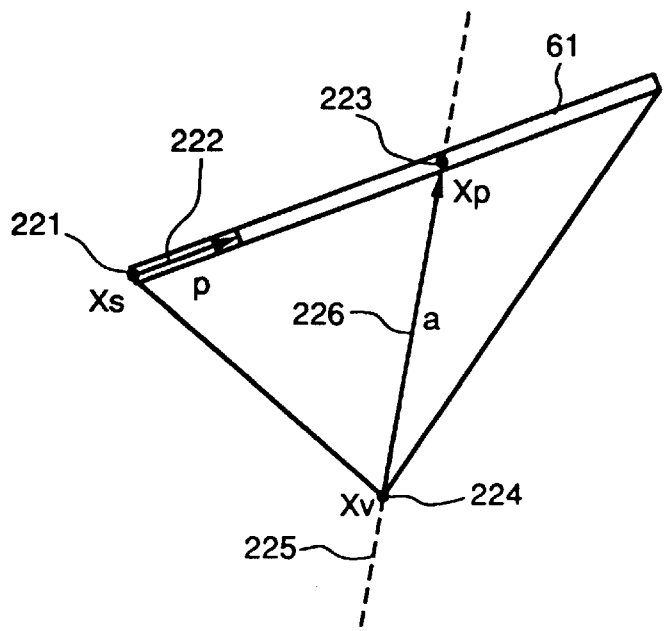
FIG. 7 is a drawing showing the principle of calculation of a visual-axis parameter of FIG. 6 according to a seventh embodiment.
Figure 8:
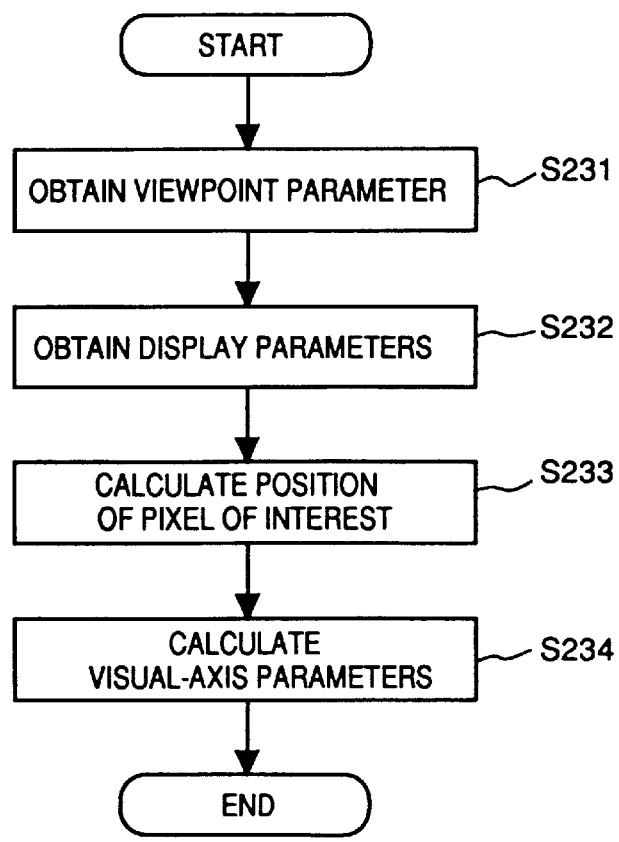
FIG. 8 is a flowchart showing a process in a visual-axis parameter calculating unit.

First described is the process for calculating the visual-axis parameter in the visual-axis parameter calculating unit 610. FIG. 7 is a drawing to show the principle of calculation in the visual-axis parameter calculating unit 610, and FIG. 8 is a flowchart to show the process in the visual-axis parameter calculating portion 610.

In FIG. 7, let Xs, Xp, Xv be position vectors of the end point 221 of the display screen 61, a pixel position 223 of a pixel of interest on the display screen 61, and a position 224 of the user's viewpoint, respectively. A vector 222 is a vector with the length being the pixel pitch of display screen 61 and the direction being an inclination of display screen 61 which is defined as a display screen vector p. The line of sight 225 hits the pixel position 223 of interest, and a vector 226 indicating an inclination of the line of sight 225 is defined as a visual-axis vector a.

The calculating unit 610 first captures the viewpoint parameter from the viewpoint parameter calculating unit 67 (step S231). The viewpoint parameter is the position 224 of the user's viewpoint in FIG. 7. The calculating unit 610 also captures the display parameter from the display parameter storage unit 64 (step S232). The display parameter is indicated by the end point 221 of display screen 61 and the display screen vector 222. The display screen vector 222 is determined by the inclination, the actual size, and the pixel size of display screen 61. Based on the position relation shown in FIG. 7, the calculating unit 610 calculates the pixel position 223 of interest on the display screen 61 by the following formula (11) in accordance with the pixel index signal 69 (step S233). Here, the pixel index signal 69 is defined by i.

$$Xp = Xs + i \cdot p \qquad (11)$$

Obtaining the pixel position 223, the calculating unit 610 then obtains a visual-axis parameter corresponding to the direction of the pixel position 223 as observed from the viewpoint position 224 (step S234), and ends the process for obtaining the visual-axis parameter. The virtual-axis parameter is expressed by a combination of the viewpoint position 224 and the visual-axis vector 226, (Xv, a). Since the line of sight 225 is a straight line passing through the two points, the pixel position 223 and the viewpoint position 224, the visual-axis vector 26 can be calculated by the following formula (12).

$$a = Xp - Xv \qquad (12)$$

Figure 9:
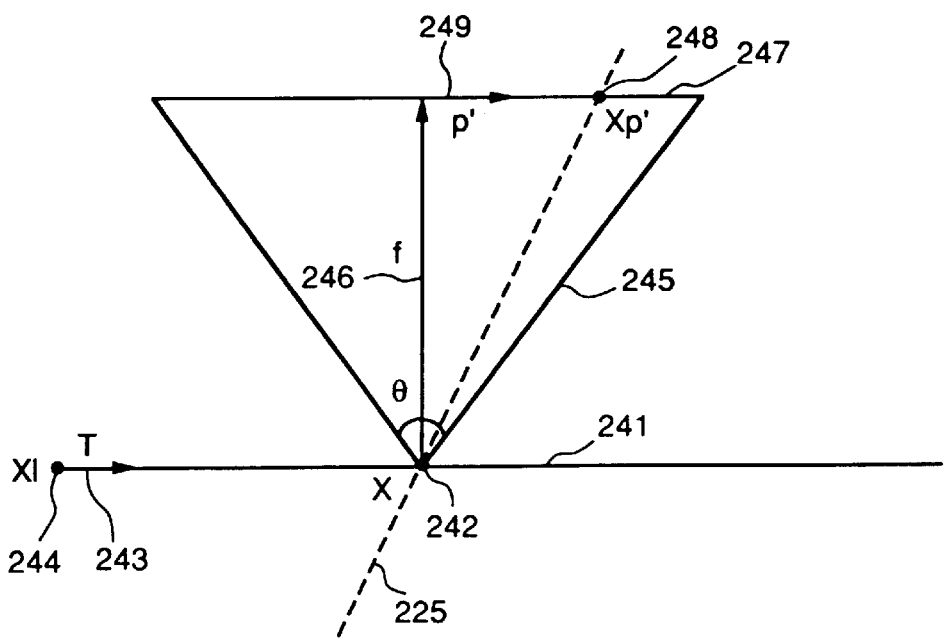
FIG. 9 is a drawing showing the principle of calculation of virtual viewpoint parameter and pixel position in the embodiment of FIG. 6.

Next described are the processes in the virtual viewpoint parameter calculating unit 611 and the pixel position calculating unit 612. FIG. 9 is a drawing to show the principle for calculation of the virtual viewpoint parameter and the pixel position.

As described previously, the viewpoints at photo-taking the images in the multi-viewpoint image database 63 are aligned on a same plane. A cross section of the plane of the alignment is indicated as a viewpoint alignment line 241 in the drawing. The virtual viewpoint 242 is expressed as an intersection between the line of sight 225 and the viewpoint line 241, a position vector of which is virtual viewpoint position vector X. Also, a vector 243 indicating the slope of viewpoint alignment line 241 is defined as a virtual-point alignment vector T, and a position vector of the end point 244 of the viewpoint alignment line 241 as Xl. A visual field 245 represents the angle of field of view θ at the virtual viewpoint 242, and a vector 246 is a focus vector f with the length being a focal length of the cameras having taken the images represented by the multi-viewpoint data and the direction being an inclination of the cameras. Further defined are a virtual pickup plane 247 at the virtual viewpoint 242 and a pixel position 248 as an intersection between the virtual pickup plane 247 and the line of sight 225. A position vector of the pixel position 248 is expressed by Xp'. A vector 249 is a pickup plane vector p' with the length being one pixel pitch of the virtual pickup plane 247 and the direction being the slope of the virtual pickup plane 247 (normally making right angles with the focus vector 246).

Here, the photo-taking viewpoint coordinate system storage unit 65 stores the viewpoint alignment vector 243 and the end point 244 of the viewpoint alignment line 241 as values indicating the photo-taking viewpoint coordinate system. Also, the multi-viewpoint image parameter storage unit 66 stores the focus vector 246 and the pickup plane vector 249 as the multi-viewpoint image parameter. The magnitude of the pickup plane vector 249 is equal to the cell size (the length of a pixel) of an actual image pickup plane.

Using the points and vectors as described above, the virtual viewpoint 242 is expressed by the following formulae (13) and (14).

$$X = Xl + t \cdot T \qquad (13)$$

$$X = Xv + \alpha \cdot a \qquad (14)$$

Here, t is a virtual viewpoint parameter, which is a parameter uniquely expressing the virtual viewpoint. In the formula (14) α is a coefficient in the direction of the line of sight. The virtual viewpoint parameter calculating unit 611 calculates t by using the formulae (13) and (14) and then obtains X.

Further, the pixel position 248 is expressed by the following formulae (15) and (16).

$$Xp'=X+f+i''p' \quad (15)$$

$$Xp'=X+\beta \cdot a \quad (16)$$

Here, i' is a pixel position parameter, which is a parameter uniquely expressing the pixel position 248. In the formula (16) β is a coefficient in the direction of the line of sight. The pixel position calculating portion 612 calculates the pixel position parameter i' by solving the formulae (15) and (16), and outputs it.

The process of the pixel value calculating unit 613 is specifically described in the following. In the present embodiment, the multi-viewpoint images held in the multi-viewpoint image database 63 are images having been taken at sufficiently fine viewpoint intervals. First, an image taken at a viewpoint nearest to the virtual viewpoint 242 is picked up from the images in the multi-viewpoint image database 63, as an approximate image to an image to be taken from the virtual viewpoint 242 indicated by the virtual viewpoint parameter calculated in the virtual viewpoint parameter calculating unit 11. Among the picked-up image a value of a pixel closest to the pixel position 248 calculated in the pixel position calculating unit 612 is selected and the selected value is output as the pixel value signal 616.

Although the above description concerned the processes, portions omitting the vertical parallax for simplicity of description, with multi-viewpoint images in the vertical direction the same method can be employed to achieve a binocular stereoscopic display apparatus which permits back-and-forth, up-and-down, or right-and-left movement of the viewpoint, taking the vertical parallax into consideration. A binocular stereoscopic display apparatus permitting the back-and-forth, up-and-down, or right-and-left movement of the viewpoint can be constructed as follows. The display screen 61 and the image display portion 68 are a stereoscopic display screen and a stereoscopic image display unit permitting binocular stereoscopic view, such as the lenticular type or the glasses type. Further, the viewpoint parameter calculating portion 67 calculates viewpoint parameters for positions of the right and left eyes and, corresponding thereto, the image generating portion 68 generates respective images to be presented to the right and left eyes.

As described above, an image corresponding to the movement of the viewpoint in the right-and-left, up-and-down, and back-and-forth directions can be easily generated and displayed.

Fourth Embodiment

Next described is a back-and-forth moving viewpoint corresponding processing apparatus which can freely display an image for moving viewpoint even if the intervals of viewpoints of the images stored in the multi-viewpoint image database 63 are not so fine. The processing apparatus is arranged to include an inter-viewpoint interpolation processing unit 618 between the multi-viewpoint image database 63 and the pixel value calculating unit 613 in the image processing apparatus of the third embodiment as described above. The inter-viewpoint interpolation processing unit 618 produces a group of images at sufficiently fine intervals of viewpoint by an interpolation process using the images in the multi-viewpoint image database 63, which have been taken at coarse intervals of viewpoints. Using the thus obtained images at sufficiently fine intervals between viewpoints, an image matching with a change of the user's viewpoint can be produced in the same manner as in the third embodiment.

The inter-viewpoint interpolation processing unit 618 is described in detail in the following. Here, the vertical parallax is not taken into consideration for simplicity of description. The multi-viewpoint image database 63 stores images from respective photo-taking viewpoints aligned on a horizontal straight line.

Figure 10:
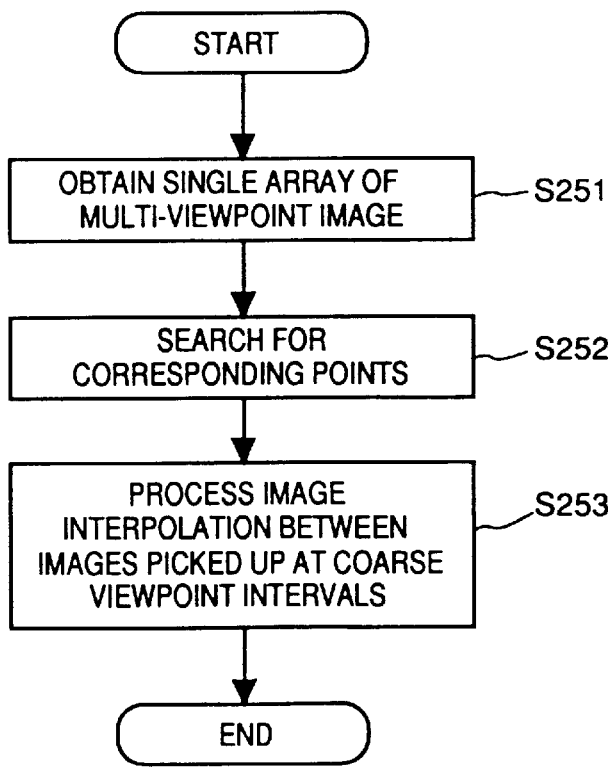
FIG. 10 is a flowchart showing a flow of a process in an inter-viewpoint interpolation processing unit in the back-and-forth moving viewpoint corresponding display unit.

FIG. 10 is a flowchart to show a flow of the process in the inter-viewpoint interpolation processing unit 618. The interpolating unit 618 captures the images having been taken at coarse intervals of viewpoint from the multi-viewpoint image database 63 (step S251). Next, a corresponding point search (motion vector detection) is carried out between the captured images (step S252). After completion of the corresponding point search, an interpolation process is carried out based on the photo-taking viewpoints to produce images at sufficiently fine intervals between the viewpoints (step S253), and the process is ended.

Figure 11:
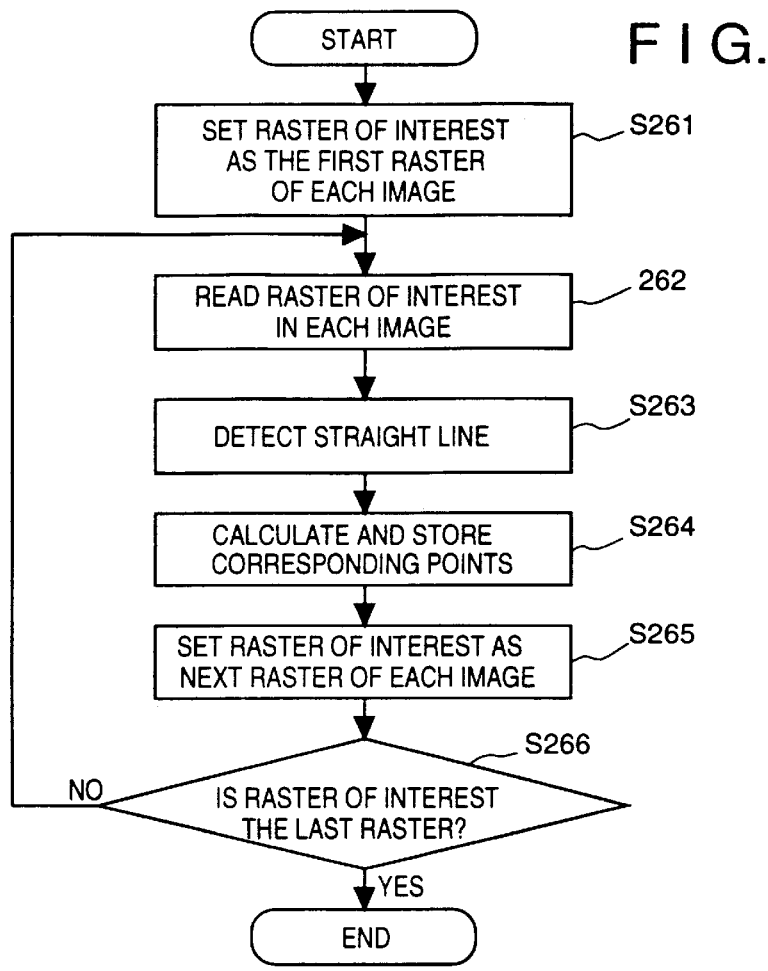
FIG. 11 is a flowchart showing a corresponding point searching process.

The corresponding point search is described by referring to the flowchart of FIG. 11.

Figure 12:
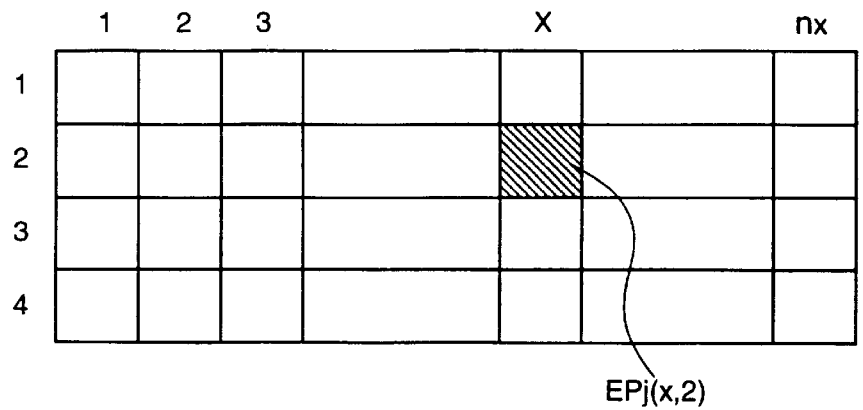
FIG. 12 is a drawing showing the j-th epipolar plane.

For initial setting, a raster of interest is set to a first raster of each image (step S261). Then the raster of interest of each image is read into a working memory (not shown) (step S262) to constitute a first virtual epipolar plane. Here, the j-th epipolar plane is a set of points $EP_j(x, i)$ satisfying the following formula, on the image plane as shown in FIG. 12:

$$EP_j(x, i)=N_i(x, j).$$

In the formula, $N_i(x, j)$ is an x-th pixel value in the j-th line of the i-th image (where i=1 to 4), which represents a value of a pixel in the i-th image having coordinates of (x, j). If image input devices such as cameras are aligned at equal intervals in parallel, all corresponding points are to be aligned on a straight line on the epipolar plane. Accordingly, interpolation of images is only to be made on this straight line.

Then a line including corresponding points is extracted (step S263), and corresponding points are calculated from the obtained line and then are stored (step S264). A specific corresponding point calculation algorithm is as follows.

Procedure A1: For $EP_j(x, i)$ ) as pixels of interest, all m's satisfying the following relation are obtained within the range of $m=k_1$ to $k_1+k_2$.

$$\sum_{i=2}^{4} \{EP_j(x + m \times (i-1), i) - EP_j(x, l)\}^2 < TH2$$

Here, TH2 is a threshold value for finding corresponding points, which is set to 1200 (=3×20²). Also $k_1$ is a value depending upon the photo-taking method of input images. If the photo-taking is carried out using cameras arranged at equal intervals and with parallel optical axes, $k_1=0$. Further, $k_2$ is a value determined by the camera intervals and the distance to an object, which is set to 20 in this example (assuming no movement exceeds 20 pixels).

Procedure A2: For all x's where x=1 to $n_x$, the procedure A1 is repeated, storing all values of m corresponding to the values of x. Here, $n_x$ represents the number of pixels in the main scanning direction of an image. If $EP_j(x+m \times (i-1), i)$ is absent, it is judged that no corresponding point exists for the m, and the process is continued.

Procedure A3: A corresponding point of the first priority is obtained from a line with slope m obtained by the procedures A1 and A2, and is stored in a memory. If a plurality of corresponding points are attained, all are stored as corresponding points of the first priority for convenience' sake. Pixels determined as corresponding points are defined as processed pixels.

Procedure A4: Considering the procedures A1 to A3 as a cycle, the above cycle is repeated for unprocessed pixels. If $EP_j(x+m\times(i-1), i)$ is already processed in the procedure A1, the process is continued setting $EP_j(x+m\times(i-1), i) - EP_j(x, 1) = 0$. If in the procedure A3, a corresponding point obtained from the line with slope m is already processed, this point is excluded from the corresponding point. A corresponding point obtained in the n-th cycle is stored as a corresponding point of the n-th priority.

Procedure A5: If the number of unprocessed pixels does not decrease after the process of procedure A4, the procedures A1 to A4 are executed with $EP_j(x, 2)$ as pixels of interest. Here, x=1 to $n_x$.

Procedure A7: The procedures A1 to A4 are repeated in the manner while increasing the value of j one by one.

Procedure A8: If the above processes are executed to the last raster, the corresponding point search process is ended.

Performing the above processes, corresponding points which could not be attained from two images, can be detected and occlusion can be well dealt with, thus improving the accuracy of corresponding point search.

Next described is the inter-viewpoint interpolation process of images (step S253 in FIG. 10). This interpolation process is carried out on corresponding points obtained at the above corresponding point search process. A specific algorithm of the interpolation process is described referring to an example in FIG. 13.

FIG. 13 shows the j-th epipolar plane. In FIG. 13, c1 represents corresponding points of the first priority and a2, b2 represent corresponding points of the second priority. Here, a case where n images are generated at equal intervals between two input images is considered, and it is assumed that n=2 for simplicity of description. Considering this case in the j-th epipolar plane, as shown in FIG. 14, two lines are interpolated between lines in the epipolar plane (i.e., epipolar lines j-2, j-3, j-5, j-6, j-8, j-9), and a value of a pixel on an interpolated line existing on a line connecting two corresponding points on the epipolar plane of the original image is set to an average of pixel values of the corresponding points. Namely, the following procedures are executed.

Procedure B1: Considering a line connecting corresponding points of the first priority, a value of a pixel in an interpolation line which is on the connecting -line is set to an average of pixel values in the original image existing on the line. Taking the corresponding points c1 in FIG. 14 as an example, an average of pixel values represented by the points c1 is considered as pixel values of the points c1 on the line connecting the corresponding points.

Procedure B2: After completion of the process for corresponding points of the first priority, corresponding points of the second priority are processed. This process is basically the same as that in the procedure B1, however, the process is not carried out on pixels already interpolated in the procedure B1. This is explained by referring to FIG. 14. Pixels (3, 8) and (2, 9) are normally interpolated by corresponding points a2, but they are already interpolated with the corresponding points of c1 of the first priority. Therefore, these pixels are not processed. Then pixels interpolated by the corresponding points a2 are four pixels of (5, 2), (4, 3), (4, 5), (3, 6). (Occlusion occurs in this portion in the example of FIG. 14, and the issue of occlusion can be dealt with by performing the above process.)

Procedure B3: After completion of the process for the corresponding points of the second priority, the process is next carried out on corresponding points of the third priority. Similarly to the procedure B2, no process is performed on already interpolated pixels. Then the process is repeated in the same manner until corresponding points of the least priority have been processed.

Procedure B4: Pixels not interpolated after completion of procedures B1 to B3 are interpolated from neighboring pixels. In this case, the interpolation method to be used may be a method using an average of neighboring pixel values, a method using a value of nearest pixel as it is, and so on.

Figure 15:
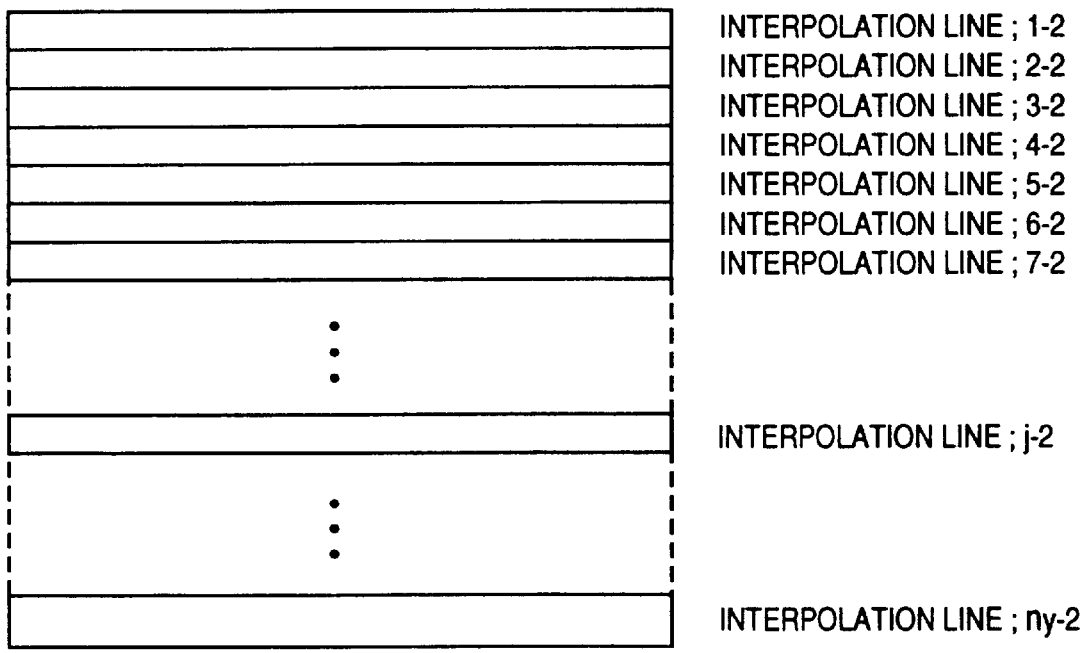
FIG. 15 is a drawing illustrating an interpolation algorithm.

Procedure B5: The processes of procedures B1 to B4 are executed for j=1 to $n_y$, and interpolation images are obtained by using the interpolation lines j-2, j-3, j-5, j-6, j-8, and j-9. For example, an interpolation image #2 shown in FIG. 15 can be constructed by arranging the interpolation lines j-2(j=1 to $n_y$) in order. Other interpolation images #3, #5, #6, #8, or #9 can be constructed in the same manner.

By producing the inter-viewpoint interpolation images from the images stored in the multi-viewpoint image database 63 as described above, images seen from viewpoints other than the photo-taking viewpoints can be obtained on the line of alignment of the photo-taking viewpoints. Thereby, images seen from arbitrary viewpoints can be produced. Accordingly, the multi-viewpoint image database 63 does not have to store multi-viewpoint images at sufficiently fine intervals of viewpoints, which is advantageous in considerably reducing the required memory capacity for the multi-viewpoint image database 3.

Although the above description concerns the case where the vertical parallax was omitted, images taking the vertical parallax into consideration can also be produced as follows. Images taken from respective photo-taking viewpoints at coarse viewpoint intervals in a grid pattern on a plane are stored in the multi-viewpoint image database 3. First, images are interpolated in the horizontal direction between the viewpoints, and then interpolated in the vertical direction between the viewpoints.

By producing interpolation images from a multitude of input images using the above-described apparatus and method, corresponding points which could not be obtained from two images can be detected, which improves the accuracy of interpolation. Since the corresponding points are obtained from a multitude of images, the issue of occlusion can be well dealt with as described above.

Next, referring to FIG. 17, a construction of a hardware for executing the above-described image processing will be described in the following.

Figure 17:
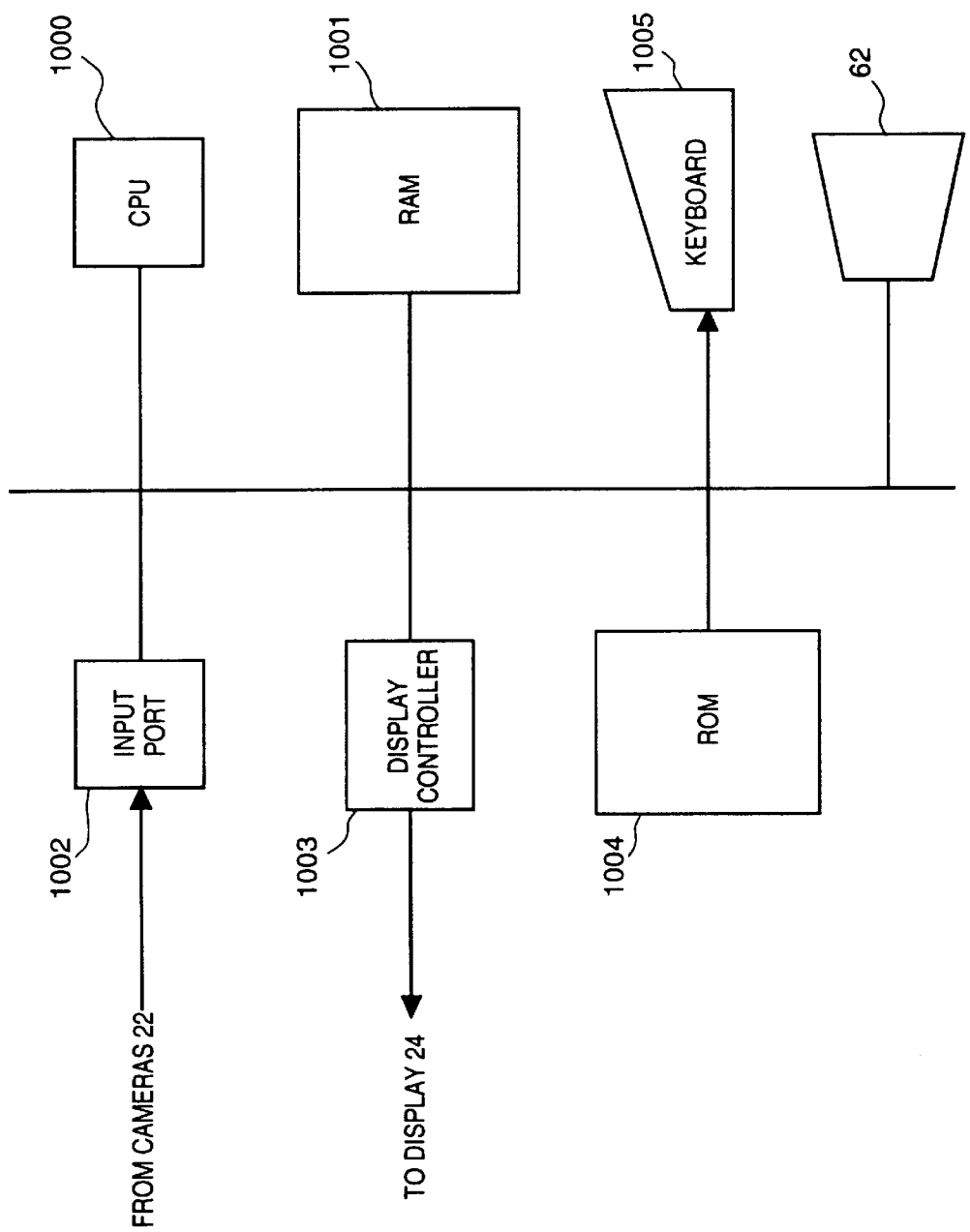
FIG. 17 is a drawing showing an example of a configuration of hardware of the image processing apparatus of the present invention.

In FIG. 17, an input port 1002 inputs image data from cameras 22, and the image data is stored at a predetermined area of RAM 1001. A display controller 1003 controls to display images being applied with various processes and various kinds of commands and data inputted from keyboard 1005 on a display 24. In ROM 1004, a program for performing the aforesaid image processing as in the above embodiments is stored and read by CPU 1000 one by one, and corresponding process is executed.

Next, the correspondence between the hardware and the aforesaid various kinds of processing units will be described.

In the image processing shown in FIG. 1, a program responsible for each processing sequence of the virtual light point generator 14, the plane coefficient calculating unit 16, the corresponding plane judging unit 17, and the corresponding plane interpolation unit 18 is stored in the ROM 1004 in advance. Further, the ROM 1004 spares an area for the judging condition storage unit 110, thus judging condition data used in the process by the corresponding plane judging unit 17 is stored therein.

RAM 1001 has memory areas for the input image storage unit 11, the end mark arrangement storage unit 19, and the output image storage unit 12. The CPU 1000 outputs the processed image which is originally inputted from the cameras 22 on the display 24 by executing programs stored in the ROM 1004.

The correspondence between the hardware and various kinds of processes in the aforesaid back-and-forth moving viewpoint corresponding display unit shown in FIG. 6 will be next explained. Programs responsible for procedure of the viewpoint parameter calculating unit 67, the image generating unit 68, the visual-axis parameter calculating unit 610, the virtual viewpoint parameter calculating unit 611, the pixel position calculating unit 612, the pixel value calculating unit 613, and the inter-viewpoint interpolation processing unit 618 are stored in the ROM 1004 in advance. Further, memory area for the display parameter storage unit 64, the photo-taking viewpoint coordinate system storage unit 65, the multi-viewpoint image parameter storage unit 66, and the multi-viewpoint image data base 63 are secured in the RAM 1001. The viewpoint detector 62 notifies the position of viewpoint to the CPU 1001. The image display unit 614 corresponds to the display controlling unit 1003. The CPU 1000 can control the display 24 to exhibit an image corresponding to the back-and-forth movement of viewpoints by executing the aforesaid programs stored in the ROM 1001.

According to the interpolation processing unit in the first and second embodiments and the back-and-forth moving viewpoint corresponding display unit in the third and fourth embodiments as described above, the user can observe images seen from the moving viewpoint not only in the up-and-down and right-and-left directions but also in the back-and-forth direction. Therefore, if the displaced viewpoint is not the photo-taking viewpoint of the multi-viewpoint image stored in the multi-viewpoint image data base 63, namely the viewpoint is not at position of one of the cameras 22, the image seen from the viewpoint of the viewer is generated by the pixel value generating unit 617. Thus the user can see the image of the object corresponding to the movement of the viewpoint on the displaying screen 61.

In the aforesaid first to fourth embodiments, a monaural display with a viewpoint detector is used as a display unit for displaying an image, however, a glasses type stereoscopic display can be used instead. Further, a head mounted type display (HMD), a lenticular display which is not a glasses type, and a holographic display can be used.

Furthermore, in the aforesaid embodiments, the multiple cameras are used as image pick-up means for taking an image of objects, however, they can be replaced by slide type cameras and a XY stage type cameras. Further, the present invention is applied not only to a still stereoscopic image but also to a moving stereoscopic image. The applicable image may be in color or in black and white.

The present invention can be also applied to a single image processing apparatus and a system such as, a multi-viewpoint television, multi-viewpoint TV telephone terminals, and multi-viewpoint teleconference system. Further, the present invention is applicable to combined devices composed of a computer and image processing apparatus.

According to the present invention as described above, corresponding points between images taken from a plurality of the photo-taking viewpoints are determined, and by interpolating pixels between the input images by using the corresponding points, images seen from viewpoints different from those of photo-taking viewpoints of the input image are generated. Accordingly, it is possible to generate a great number of interpolation images between the input images taken from the photo-taking viewpoints at fine intervals so as to fill the gap between them, and an image smoothly changing in accordance with the movement of the viewpoint can be obtained.

For example, if photo-taking viewpoints are set in the up-and-down and right-and-left directions so as to make the object in the center in a plane apart from the object at a predetermined distance, the viewer can move his/her viewpoint in the up-and-down and right-and-left directions smoothly.

According to other advantage of the present invention, the image interpolation means adds information indicating pixels which have been processed with interpolation, thus the pixels which have already processed with interpolation are not used in the interpolation performed later. Therefore, quality of the interpolation image can be improved.

According to other advantage of the present invention, since a viewpoint of the viewer is detected as well as a new image corresponding to the viewpoint is generated by using the interpolation image generated by the image interpolation means, it is possible to generate an image at an arbitrary position designated by the viewer's viewpoint. Accordingly, the viewpoints of the image can be smoothly moved not only in the up-and-down and right-and-left directions but also in the back-and-forth direction.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
   a corresponding pixel detecting step of detecting corresponding pixels among object images picked up from a plurality of viewpoints, including:
   a virtual light point generating step of generating virtual light points, in sequence, from a position between the viewpoints and the object, moving toward the object; and
   a detecting step of detecting the corresponding pixels by comparing pixel values at pixel positions, which correspond to a pixel position of the generated virtual light point, in the object images picked up from said plurality of viewpoints, further wherein at the detecting step, a predetermined mark is put to the detected corresponding pixels and, when a pixel having the predetermined mark exists, it is determined that occlusion occurs at the virtual light point, and the corresponding pixels are determined by using pixels of images seen from viewpoints other than viewpoints at which occlusion has occurred, where the pixels correspond to the virtual light point; and
   an interpolation step of interpolating object images seen from viewpoints other than said plurality of viewpoints in response to the detected corresponding pixels.

2. The image processing method according to claim 1, wherein, at said interpolation step, an average of the pixel values of corresponding pixels detected at said corresponding pixel detecting step is set as an interpolated pixel value at a pixel position of an object image seen from a viewpoint other than said plurality of viewpoints, where the pixel position of the object images corresponds to the position of the virtual light point corresponding to the corresponding pixels detected at said corresponding pixel detecting step.

3. The image processing method according to claim 1, wherein a pixel position in the object image seen from a viewpoint other than said plurality of viewpoints is calculated based on a plane function with a pixel position of the virtual light point and positions of said plurality of viewpoints as parameters.

4. The image processing method according to claim 1, wherein cameras are placed at said plurality of viewpoints.

5. The image processing method according to claim 1, wherein said plurality of viewpoints are arranged on a plane and viewpoints other than said plurality of viewpoints also exist on the plane.

6. A three dimensional viewpoint movement corresponding image processing method comprising:

a viewpoint detecting step of detecting positions of viewer's eyes; and an image generating step of generating an image seen from the positions of viewer's eyes detected at said viewpoint detecting step by using at least a part of the images, corresponding to each viewpoint, which are generated by the image processing method according to the claim 1.

7. The three dimensional viewpoint movement corresponding image processing method according to claim 6, wherein said part of the images are generated images seen at the plurality of different distances from the object to the plurality of viewpoints.

8. A three dimensional viewpoint movement corresponding image processing method comprising:

a viewpoint detecting step of detecting positions of viewer's eyes;

an image generating step of generating images seen from the positions of the viewer's eyes in response to the positions of viewer's eyes detected at said viewpoint detecting step and generated images seen at the plurality of different distances from the object to the plurality of viewpoints, where the generated images are generated by said three dimensional viewpoint movement corresponding image processing method according to claim 7; and a displaying step of displaying images generated at said image generating step.

9. The three dimensional viewpoint movement corresponding image processing method according to claim 8, wherein, at said displaying step, the images generated at said image generating step are displayed on a stereoscopic image display.

10. The three dimensional viewpoint movement corresponding image processing method according to claim 8, wherein, at said displaying step, the images generated at said image generating step are displayed on a head mount display.

11. The three dimensional viewpoint movement corresponding image processing method according to claim 8, wherein, at said displaying step, the images generated at said image generating step are displayed on a lenticular display.

12. An image processing apparatus comprising:

corresponding pixel detecting means for detecting corresponding pixels among object images picked up from a plurality of viewpoints, including:

virtual light point generating means for generating virtual light points, in sequence, from a position between the viewpoints and the object, moving toward the object; and detecting means for detecting the corresponding pixels by comparing pixel values at pixel positions, which correspond to a pixel position of the generated virtual light point, in the object images picked up from said plurality of viewpoints, further wherein the detecting means puts a predetermined mark to the detected corresponding pixels and, when a pixel having the predetermined mark exists, it is determined that occlusion occurs at the virtual light point, and the corresponding pixels are determined by using pixels of images seen from viewpoints other than viewpoints at which occlusion has occurred, where the pixels correspond to the virtual light point; and interpolation means for interpolating object images seen from a viewpoint other than said plurality of viewpoints in response to the detected corresponding pixels.

13. The image processing apparatus according to claim 12, wherein a pixel position in the object image seen from a viewpoint other than said plurality of viewpoints is calculated based on a plane function with a pixel position of the virtual light point and positions of said plurality of viewpoints as parameters.

14. The image processing apparatus according to claim 12, wherein cameras are placed at said plurality of viewpoints.

15. The image processing apparatus according to claim 12, wherein said interpolation means sets an average of the pixel values of corresponding pixels detected by said corresponding pixel detecting means as a interpolated pixel value at a pixel position of an object image seen from a viewpoint other than said plurality of viewpoints, where the pixel position of the object images corresponds to the position of the virtual light point corresponding to the corresponding pixels detected by said corresponding pixel detecting means.

16. The image processing apparatus according to claim 12, wherein said plurality of viewpoints are arranged on a plane and viewpoints other than said plurality of viewpoints also exist on the plane.

17. A three dimensional viewpoint movement corresponding image processing apparatus comprising:

viewpoint detecting means for detecting positions of viewer's eyes; and image generating means for generating an image seen from the positions of viewer's eyes detected by said viewpoint detecting means by using at least a part of the images, corresponding to each viewpoint, which are generated by the image processing apparatus according to the claim 12.

18. The three dimensional viewpoint movement corresponding image processing apparatus according to claim 17, wherein said part of the images are generated images seen at the plurality of different distances from the object to the plurality of viewpoints.

19. A three dimensional viewpoint movement corresponding image processing apparatus comprising:

viewpoint detecting means for detecting positions of viewer's eyes;

image generating means for generating images seen from the positions of the viewer's eyes in response to the positions of viewer's eyes detected by said viewpoint detecting means and the generated images seen at the plurality of different distances from the object to the plurality of viewpoints, where the generated images are generated by said three dimensional viewpoint movement corresponding image processing apparatus according to claim 18; and displaying means for displaying images generated by said image generating means.

20. The three dimensional viewpoint movement corresponding image processing apparatus according to claim 19, wherein, in said displaying means, the images generated at said image generating means are displayed on a stereoscopic image display.

21. The three dimensional viewpoint movement corresponding image processing apparatus according to claim 19, wherein, in said displaying means, the images generated at said image generating means are displayed on a head mount display.

22. The three dimensional viewpoint movement corresponding image processing apparatus according to claim 19, wherein, in said displaying means, the images generated at said image generating means are displayed on a lenticular display.

23. An image processing method for forming a virtual angled image from a plurality of images picked-up by a plurality of cameras placed at relatively separated positions comprising:

a corresponding pixel detecting step of detecting corresponding pixels among object images picked up from a plurality of viewpoints each based on position information of each of said plurality of cameras;

a selecting step of selecting pixels usable for interpolating operation among the detected corresponding pixels, the selected pixels satisfying a predetermined condition that the selected pixels have not been used for the interpolating operation so as to prevent a deterioration of the interpolated image quality; and an image producing step of producing an object image seen from an optimal viewpoint other than said plurality of viewpoints by interpolating a plurality of the selected pixels.

24. The image processing method according to claim 23, wherein said corresponding pixel detecting step comprises:

a virtual light point generating step of generating virtual light points, in sequence, from a position between the viewpoints and the object, moving toward the object; and a detecting step of detecting the corresponding pixels by comparing pixel values at pixel positions, which correspond to a pixel position of the generated virtual light point, in the object images picked up from said plurality of viewpoints.

25. The image processing method according to claim 24, wherein, at said image producing step, an average of the pixel values of corresponding pixels detected at said corresponding pixel detecting step is set as an interpolated pixel value at a pixel position of an object image seen from a viewpoint other than said plurality of viewpoints, where the pixel position of the object images corresponds to the position of the virtual light point corresponding to the corresponding pixels detected at said corresponding pixel detecting step.

26. The image processing method according to claim 24, wherein a pixel position in the object image seen from a viewpoint other than said plurality of viewpoints is calculated based on a plane function with a pixel position of the virtual light point and positions of said plurality of viewpoints as parameters.

27. The image processing method according to claim 24, wherein, at said corresponding pixel detecting step, a predetermined mark is put to the detected corresponding pixels and, when a pixel having the predetermined mark exists, it is determined that occlusion occurs at the virtual light point, and the corresponding pixels are determined by using pixels of images seen from viewpoints other than viewpoints at which occlusion has occurred, where the pixels correspond to the virtual light point.

28. The image processing method according to claim 23, wherein cameras are placed at said plurality of viewpoints.

29. The image processing method according to claim 23, wherein said plurality of viewpoints are arranged on a plane and viewpoints other than said plurality of viewpoints also exist on the plane.

30. A three dimensional viewpoint movement corresponding image processing method comprising:

a viewpoint detecting step of detecting positions of viewer's eyes; and an image generating step of generating an image seen from the positions of viewer's eyes detected at said viewpoint detecting step by using at least a part of the images, corresponding to each viewpoint, which are generated by the image processing method according to the claim 23.

31. The three dimensional viewpoint movement corresponding image processing method according to claim 30, wherein said part of the images are generated images seen at the plurality of different distances from the object to the plurality of viewpoints.

32. A three dimensional viewpoint movement corresponding image processing method comprising:

a viewpoint detecting step of detecting positions of viewer's eyes:

an image generating step of generating images seen from the positions of the viewer's eyes in response to the positions of viewer's eyes detected at said viewpoint detecting step and the generated images seen at the plurality of different distances from the object to the plurality of viewpoints, where the generated images are generated by said three dimensional viewpoint movement corresponding image processing method according to claim 31; and a displaying step of displaying images generated at said image generating step.

33. The three dimensional viewpoint movement corresponding image processing method according to claim 32, wherein, at said displaying step, the images generated at said image generating step are displayed on a stereoscopic image display.

34. The three dimensional viewpoint movement corresponding image processing method according to claim 32, wherein at said displaying step, the images generated at said image generating step are displayed on a head mount display.

35. The three dimensional viewpoint movement corresponding image processing method according to claim 32, wherein at said displaying step, the images generated at said image generating step are displayed on a lenticular display.

36. An image processing apparatus for forming a virtual angled image from a plurality of images picked-up by a plurality of cameras placed at relatively separated positions comprising:

corresponding pixel detecting means for detecting corresponding pixels among object images picked up from a plurality of viewpoints each based on position information of each of said plurality of cameras;

selecting means for selecting pixels usable for interpolating operation among the detected corresponding pixels, the selected pixels satisfying a predetermined condition that the selected pixels have not been used for the interpolating operation so as to prevent a deterioration of the interpolation image quality; and image producing means for producing an object image seen from an optional viewpoint other than said plurality of viewpoints by interpolating a plurality of the selected pixels.

37. The image processing apparatus according to claim 36, wherein said corresponding pixel detecting means comprises:

virtual light point generating means for generating virtual light points, in sequence, from a position between the viewpoints and the object, moving toward the object; and detecting means for detecting the corresponding pixels by comparing pixel values at pixel positions, which correspond to a pixel position of the generated virtual light point, in the object images picked up from said plurality of viewpoints.

38. The image processing apparatus according to claim 37, wherein said image producing means sets an average of the pixel values of corresponding pixels detected by said corresponding pixel detecting means as an interpolated pixel value at a pixel position of an object image seen from a viewpoint other than said plurality of viewpoints, where the pixel position of the object images corresponds to the position of the virtual light point corresponding to the corresponding pixels detected by said corresponding pixel detecting means.

39. The image processing apparatus according to claim 37, wherein a pixel position in the object image seen from a viewpoint other than said plurality of viewpoints is calculated based on a plane function with a pixel position of the virtual light point and positions of said plurality of viewpoints as parameters.

40. The image processing apparatus according to claim 37, wherein said corresponding pixel detecting means puts a predetermined mark to the detected corresponding pixels and, when a pixel having the predetermined mark exists, it is determined that occlusion occurs at the virtual light point, and the corresponding pixels are determined by using pixels of images seen from viewpoints other than viewpoints at which occlusion has occurred, where the pixels correspond to the virtual light point.

41. The image processing apparatus according to claim 36, wherein cameras are placed at said plurality of viewpoints.

42. The image processing apparatus according to claim 36, wherein said plurality of viewpoints are arranged on a plane and viewpoints other than said plurality of viewpoints also exist on the plane.

43. A three dimensional viewpoint movement corresponding image processing apparatus comprising:

viewpoint detecting means for detecting positions of viewer's eyes; and image generating means for generating an image seen from the positions of viewer's eyes detected by said viewpoint detecting means by using at least a part of the images, corresponding to each viewpoint, which are generated by the image processing apparatus according to the claim 40.

44. The three dimensional viewpoint movement corresponding image processing apparatus according to claim 43, wherein said part of the images are generated images seen at the plurality of different distances from the object to the plurality of viewpoints.

45. A three dimensional viewpoint movement corresponding image processing apparatus comprising:

viewpoint detecting means for detecting positions of viewer's eyes;

image generating means for generating images seen from the positions of the viewer's eyes in response to the positions of viewer's eyes detected by said viewpoint detecting means and the generated images seen at the plurality of different distances from the object to the plurality of viewpoints, where the generated images are generated by said three dimensional viewpoint movement corresponding image processing apparatus according to claim 44; and displaying means for displaying images generated by said image generating means.

46. The three dimensional viewpoint movement corresponding image processing apparatus according to claim 45, wherein, in said displaying means, the images generated at said image generating means are displayed on a stereoscopic image display.

47. The three dimensional viewpoint movement corresponding image processing apparatus according to claim 45, wherein, in said displaying means, the images generated at said image generating means are displayed on a head mount display.

48. The three dimensional viewpoint movement corresponding image processing apparatus according to claim 45, wherein, in said displaying means, the images generated at said image generating means are displayed on a lenticular display.

* * * * *

UNITED STATES PATENT AND TRADEMARK OFFICE
CERTIFICATE OF CORRECTION

PATENT NO. : 6,233,004 B1
DATED : May 15, 2001
INVENTOR(S) : Koichiro Tanaka, Akihiro Katayama and Takahiro Oshino It is certified that error appears in the above-identified patent and that said Letters Patent is hereby corrected as shown below:

<u>Title page,</u>
Item [54], line 1, delete "IMAGE PROCESSING METHOD AND APPARATUS" and insert therefor -- IMAGE INTERPOLATION METHOD AND APPARATUS --.
Item [75], line 3, after Yokohama, please add -- -- Shi --.

<u>Column 14,</u>
Line 58, please delete "$EP_j(x+mxx(i-1), i)$", and insert therefor -- $EP_j(x+mx(i-1), i)$ --.

<u>Column 15,</u>
Line 57, please delete "cl", and insert therefor -- c1 --.

<u>Column 24, claim 43,</u>
Line 11, please delete "40"; and insert therefor -- 36 --.

Signed and Sealed this

Twenty-sixth Day of March, 2002

Attest:

JAMES E. ROGAN
*Attesting Officer*     *Director of the United States Patent and Trademark Office*